United States Patent

Nakamura et al.

[11] Patent Number: 6,104,117
[45] Date of Patent: Aug. 15, 2000

[54] MOTOR WITH REDUCED CLOGGING TORQUE INCORPORATING STATOR SALIENT POLES AND ROTOR MAGNETIC POLES

[75] Inventors: Tomokazu Nakamura, Katano; Ichiro Masago, Toyonaka; Koichi Uchida, Higashiosaka, all of Japan

[73] Assignee: Matsushita Electric Industrial Co., Ltd., Osaka, Japan

[21] Appl. No.: 08/983,146

[22] PCT Filed: May 23, 1997

[86] PCT No.: PCT/JP97/01732

§ 371 Date: Feb. 25, 1998

§ 102(e) Date: Feb. 25, 1998

[87] PCT Pub. No.: WO97/45945

PCT Pub. Date: Dec. 4, 1997

[30] Foreign Application Priority Data

May 24, 1996 [JP] Japan .................................... 8-129506
Jan. 10, 1997 [JP] Japan .................................... 9-002640

[51] Int. Cl.[7] .............................. H02K 1/02; H02K 1/14; H02K 21/14
[52] U.S. Cl. .......................... 310/254; 310/156; 310/269
[58] Field of Search .................................... 310/49 R, 51, 310/156, 187, 191, 193, 216, 254, 261, 265, 269; 29/596, 597, 598

[56] References Cited

U.S. PATENT DOCUMENTS

| 4,874,975 | 10/1989 | Hertrich | 310/186 |
| 4,933,584 | 6/1990 | Harms et al. | 310/162 |
| 5,220,228 | 6/1993 | Sibata | 310/254 |
| 5,250,867 | 10/1993 | Gizaw | 310/179 |
| 5,260,620 | 11/1993 | Morrill | 310/185 |
| 5,306,976 | 4/1994 | Beckman | 310/215 |

FOREIGN PATENT DOCUMENTS

| 5842708 | 9/1983 | Japan . |
| 4-76173 | 7/1992 | Japan . |
| 6-81463 | 10/1994 | Japan . |
| 7147745 | 6/1995 | Japan . |
| 8308198 | 11/1996 | Japan . |

OTHER PUBLICATIONS

An English Language Abstract of JP 58–42708.
An English Language Abstract of JP 6–81463.
An English Language Abstract of JP 7–147745.
An English Language Summary of JP 4–76173.
An English Language Abstract of JP 8–308198.

Primary Examiner—Thomas M. Dougherty
Assistant Examiner—Tran N Nguyen
Attorney, Agent, or Firm—Greenblum & Bernstein, P.L.C.

[57] ABSTRACT

In the permanent magnet motor of the present invention, where P is an integer not smaller than one, the number of magnetic poles of a rotor (22) is set to 2P, and the number of salient poles of a stator field core (21) is set to 3P. The salient pole section (21a) of each stator field core (21) is provided with two supplemental grooves (24). A salient pole magnetic interpolar angle is 4θ, such that two supplemental grooves (24) of each salient pole section (21a) are arranged in positions at angles of θ and 3θ with respect to the center of a winding slot (27) in the circumferential direction of the rotor. With this structure, a fundamental wave component of a clogging torque is removed and a permanent magnet motor having a low clogging torque is provided.

14 Claims, 23 Drawing Sheets

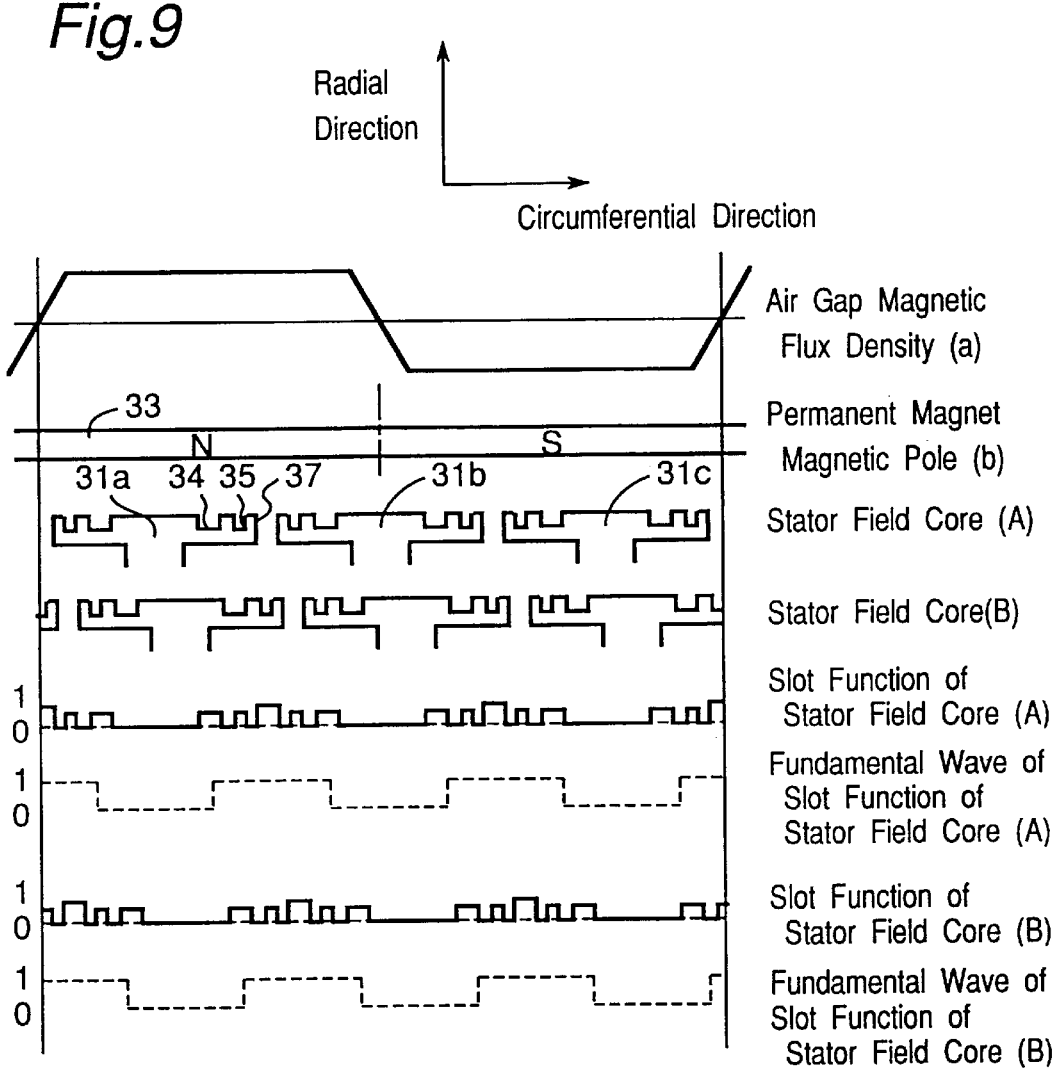

Prior Art

Prior Art

MOTOR WITH REDUCED CLOGGING TORQUE INCORPORATING STATOR SALIENT POLES AND ROTOR MAGNETIC POLES

TECHNICAL FIELD

The present invention relates to a motor magnet structure, and in particular, to a permanent magnet motor for use in machine tools, garment manufacturing machines, robots and the like.

BACKGROUND ART

The permanent magnet motor which is one of the motors has been conventionally well known. In regard to the permanent magnet motor, one whose stator field core is provided with a supplemental groove for reducing a cogging torque is disclosed in the document of Japanese Patent Publication No. SHO 58-42708, and a further one whose stator field core is provided with a supplemental salient pole and a supplemental groove is disclosed in the document of Japanese Patent Publication No. HEI 6-81463 and so on.

FIG. 23A is a view showing an example of the construction of a prior art permanent magnet motor provided with a supplemental groove for reducing the cogging torque, while FIG. 24 is an enlarged view showing the essential part of the motor shown in FIG. 23A.

As shown in FIG. 23A, this prior art permanent magnet motor is substantially constructed of a stator field core 1 and a rotor 2. In this case, six permanent magnetic poles 3 are fixed on the periphery of the rotor 2. That is, the rotor 2 is the permanent magnet rotor. Further, a plurality of supplemental grooves 5 are formed at regular intervals in a rotor circumference direction at a salient pole section 1a of the stator field core 1. It is to be noted that a winding slot 7 is provided between adjacent stator field cores 1 (salient pole sections 1a).

As shown in FIG. 24, in the above permanent magnet motor, assuming that P is an integer not smaller than one, then the number of the permanent magnetic poles 3 (magnetic pole count) fixed to the rotor 2 is generally set to 2P, and the number of the salient pole sections 1a (salient pole count) of the stator field core 1 is set to 3P. Further assuming that an angle corresponding to the length of the stator field core 1 in the rotor circumference direction is 3θ, then two supplemental grooves 5 of the salient pole section 1a of the stator field core 1 are arranged so that an angle corresponding to the interval in the rotor circumference direction is θ. In this case, an angle corresponding to the length in the rotor circumference direction of each permanent magnetic pole 3 is 4.5θ. In this case, when the supplemental grooves 5 are not provided, the degree of the lowest common multiple of the number of the permanent magnetic poles 3 (magnetic pole count) and the number of the salient pole sections 1a (salient pole count) of the stator field core 1 is the cogging torque per rotation of the rotor 2, and the cogging torque is 6P (the lowest common multiple of 2P and 3P) per rotation in this case.

In contrast to this, when the supplemental grooves 5 are provided, the salient pole sections are apparently increased in number, and the cogging torque is 18P (the lowest common multiple of 2P and 3×3P) per rotation in this case. However, in this case, actually a triple higher harmonic (the degree of 18P per rotation) is superimposed on a fundamental wave (the degree of 6P per rotation).

Specifically, in a case where P=3, the fundamental wave of the cogging torque has 18 waves per rotation (one wave per 20°). However, a waveform including the triple higher harmonic on its fundamental wave results since the supplemental grooves 5 are provided as shown in FIG. 23B, when a cogging torque waveform 6b does not become a cogging torque having only the higher harmonic component of 54 waves per rotation.

As described above, the apparent cogging torque is reduced by incorporating the high-degree components into the fundamental wave component of the cogging torque with the provision of the supplemental grooves at regular intervals in the prior art stator field core, however, it does not have the optimum supplemental groove arrangement capable of sufficiently removing the fundamental wave component.

Furthermore, in the prior art permanent magnet motor in which the stator field core is provided with the supplemental salient pole section and the supplemental groove, there is the problem that the winding is hard to be achieved since the supplemental salient pole section is formed on the stator field core. For the purpose of improving this problem, there can be considered a measure for dividing the stator field core into a plurality of cut type cores. However, in this case, the cores are increased in number to incur an increased number of assembly processes and cause a problem that the structural strength of the stator field core is weakened.

Furthermore, the prior art permanent magnet motor has the problem that the torque pulsation increases depending on the control system even though its cogging torque is low.

The present invention has been developed to solve the aforementioned conventional problems, and its object is to provide a permanent magnet motor having a low cogging torque or a permanent magnet motor having a reduced torque pulsation capable of arranging supplemental grooves in optimum positions and being assembled through the assembly processes equivalent in number to those of the prior arts while assuring the structural strength equivalent to those of the prior arts even when the stator field core is divided into cut type cores.

DISCLOSURE OF THE INVENTION

According to the motor of the present invention developed for solving the aforementioned problems, assuming that N is an odd number not smaller than three, then the slot angle of the salient pole section of the stator field core is set to 1/N with respect to the angle of the permanent magnet magnetic pole of the permanent magnet rotor when no supplemental groove is provided. When a supplemental groove is provided, assuming that P is an integer not smaller than one, then the number of the permanent magnet magnetic poles (magnetic pole count) of the rotor is set to 2P, the number of the salient pole sections (salient pole count) of the stator field core is set to 3P and the salient pole section of each stator field core is provided with two supplemental grooves. When the angular interval between salient pole sections is 4θ, the supplemental grooves are arranged in positions at angles of θ and 3θ with respect to the center of the winding slot. With this arrangement, a motor having a low cogging torque is obtained.

Furthermore, with a skew structure corresponding to motor control, a permanent magnet motor having a low cogging torque or a permanent magnet motor having a small torque pulsation can be obtained.

More specifically, according to a first aspect of the present invention, there is provided a motor characterized in that the number of permanent magnet magnetic poles of a rotor (magnetic pole count) is set to 2P and the number of salient poles of a stator field core (salient pole count) is set to 3P with respect to an integer P of not smaller than one and a slot angle of a salient pole section of the stator field core is set to 1/N of the angle of one permanent magnet magnetic pole with respect to an odd number N of not smaller than three. In this motor, a force exerted in the circumferential direction on the stator magnetic pole surface is balanced in any position during the rotation at each salient pole section. Thus, according to the first aspect of the present invention, a permanent magnet motor having a low cogging torque can be provided when the stator field core is either an integrated type core or a divided type core.

According to a second aspect of the present invention, there is provided a motor characterized in that the number of permanent magnet magnetic poles of a rotor is set to 2P and the number of salient poles of a stator field core is set to 3P with respect to an integer P of not smaller than one, the salient pole section of each stator field core is provided with two supplemental grooves, and assuming that an angular interval between salient pole sections is 4θ, then the two supplemental grooves are arranged in positions at angles of θ and 3θ with respect to a center of a winding slot in the circumferential direction of the rotor. In this motor, since the supplemental grooves are provided, the area facing the, magnetic pole can be widened. Thus, according to the second aspect of the present invention, the torque can be increased while suppressing the cogging torque.

In the motor of the second aspect, it is preferred that the two supplemental grooves have their centers arranged in the positions at angles of θ and 3θ with respect to the center of the winding slot in the circumferential direction of the rotor. In this case, the positions of the supplemental grooves become more appropriate, so that the cogging torque can be further reduced. With this appropriate arrangement, the cogging torque can be effectively suppressed.

In the motor of the second aspect, the two supplemental grooves may have their end portions on the salient pole magnetic pole center side arranged in the positions at angles of θ and 3θ with respect to the center of the winding slot in the circumferential direction of the rotor. In this case, the positions of the supplemental grooves become more appropriate, so that the cogging torque can be further reduced. With this appropriate arrangement, the cogging torque can be effectively suppressed.

In the motor of the second aspect, the two supplemental grooves may have their end portions on the winding slot side arranged respectively in the positions at angles of θ and 3θ with respect to the center of the winding slot in the circumferential direction of the rotor. Also in this case, the positions of the supplemental grooves become more appropriate, so that the cogging torque can be further reduced. With this appropriate arrangement, the cogging torque can be effectively suppressed.

In each of the aforementioned motors, it is preferred that the permanent magnet rotor is skewed within a range of not smaller than 0.4 time to not greater than one time the slot pitch γ of the salient pole section of the stator field core. In this case, the torque pulsation is reduced by the skew structure.

In this case, it is further preferred that the permanent magnet rotor is skewed by 5/6 times the slot pitch γ of the salient pole section of the stator field core. In this case, the induction voltage of the motor can be made to have a trapezoidal waveform. By thus making the induction voltage of the motor have a trapezoidal waveform, a torque ripple occurring in the electrifying stage can be suppressed.

Furthermore, it is also preferred that the permanent magnet rotor is skewed by 0.5 time the slot pitch γ of the salient pole section of the stator field core. In this case, the induction voltage of the motor can be made to have a sine waveform. By thus making the induction voltage of the motor have a sine waveform, a torque ripple occurring in the electrifying stage can be suppressed.

Furthermore, the permanent magnet rotor may be skewed by 0.47 time the slot pitch γ of the salient pole section of the stator field core. In this case, the induction voltage of the motor can be made to have a sine waveform. By thus making the induction voltage of the motor have a sine waveform, a torque ripple occurring in the electrifying stage can be suppressed.

In each of the aforementioned motors, it is preferred that a width α of the winding slot of the stator field core and a width β of the supplemental groove, which are facing the rotor, are set within a range of $0.5\alpha < \beta < 1.5\alpha$. In this case, the cogging torque can be reduced and the shape of the stator field core can be freely formed. Consequently, the cogging torque can be suppressed and the motor can be easily manufactured.

Furthermore, the width α of the winding slot of the stator field core and the width β of the supplemental groove, which are facing the permanent magnet rotor, may be set so that $\alpha = \beta$. In this case, the width of the winding slot becomes appropriate, so that the cogging torque can be further reduced. Eventually, the cogging torque can be suppressed and the motor can be easily manufactured.

In each of the aforementioned motors, assuming that the radius of the stator field core surface facing the permanent magnet rotor is r, then it is preferred that a width Wt of the salient pole section of the stator field core is set so that $Wt > 3 \cdot r \cdot \cos \theta$. In this case, the torque of the motor is increased, so that the cogging torque can be further reduced. Eventually, a motor of which the torque is great and the cogging is reduced can be provided.

Furthermore, in each of the aforementioned motors, it is preferred that a minimum width Wy of the salient pole section of a yoke section between salient pole sections of the permanent magnet stator field core and a width Wt of the salient pole section are set so that $2 \cdot Wy \geq Wt$. In this case, the magnetic flux of the iron core smoothly flows, so that the torque of the motor is increased.

BRIEF DESCRIPTION OF THE DRAWINGS

FIG. 9 is a chart for explaining the principle that no cogging torque is generated in a permanent magnet motor according to a third embodiment of the present invention;

BEST MODE FOR CARRYING OUT THE INVENTION (First Embodiment)

Figure 1:
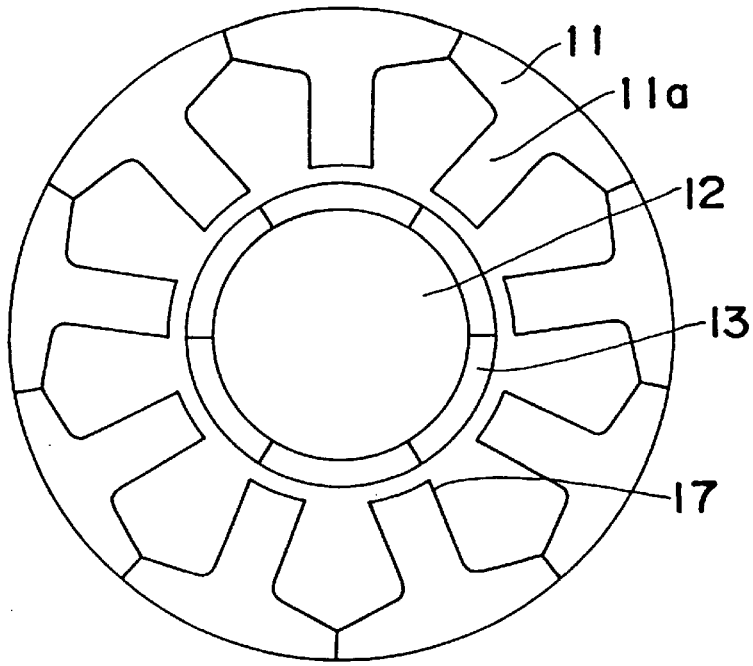
FIG. 1 is a view showing the structure of a permanent magnet motor according to a first embodiment of the present invention.
Figure 2:
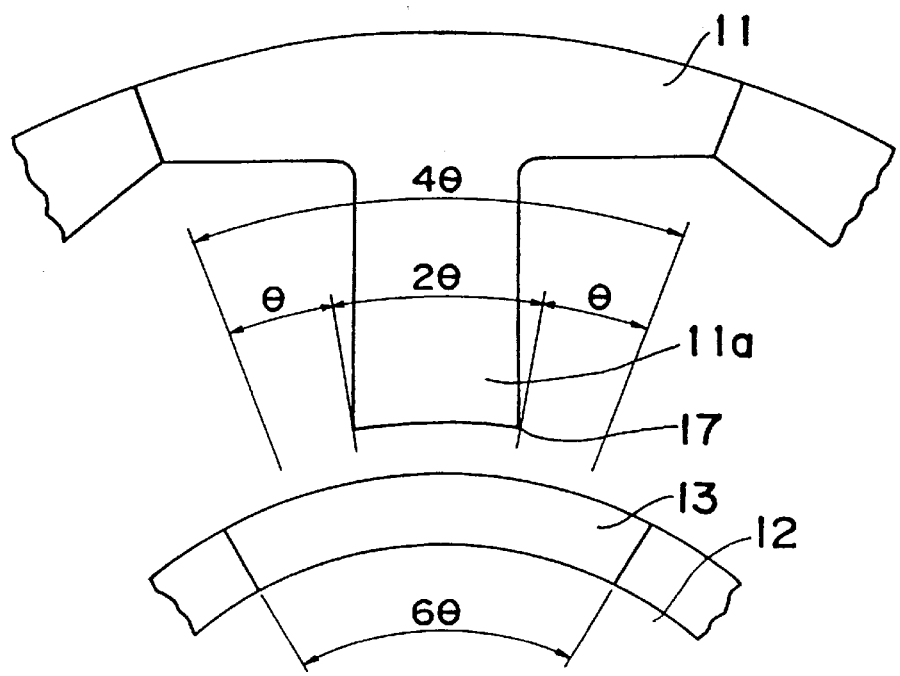
FIG. 2 is an enlarged view of the essential part of the permanent magnet motor shown in FIG. 1.

FIG. 1 is a sectional view of a permanent magnet motor of a 6-pole 9-slot type, while FIG. 2 is an enlarged view of the essential part of this motor. As shown in FIG. 1, this motor is provided with a stator in which nine stator field cores 11 are assembled into a circular arc shape. Each of the stator field cores 11 is provided with a salient pole section 11a which is formed so as to protrude toward the center side of the motor. In this case, a rotor 12 (permanent magnet rotor) is arranged in a space inside the ring-shaped stator, where six permanent magnet magnetic poles 13 are fixed in a circular arc shape on the peripheral portion of this rotor 12. A winding is wound around a winding slot 17 provided between adjacent two stator field cores 11. When a current is made to flow through this winding, the rotor 12 rotates to drive the motor.

As shown in FIG. 2, an angle θ between a straight line which extends through the center of the rotor 12 (rotor center) and a contact surface of adjacent two stator field cores 11 and a straight line which extends through the rotor center and a tip corner portion of the salient pole section 11a is referred to as a "slot angle θ" of the salient pole section 11a. It is to be noted that the term "angle" means the central angle of the rotor 12 when singly used. As is apparent from FIG. 2, an angle of the permanent magnet magnetic pole 13 with respect to the length (circular arc portion) in the rotor circumference direction is set to 6θ, an angle of the stator field core 11 with respect to the length in the rotor circumference direction is set to 4θ, and an angle of a tip portion of the salient pole section 11a with respect to the length in the rotor circumference direction is set to 2θ.

Figure 3:
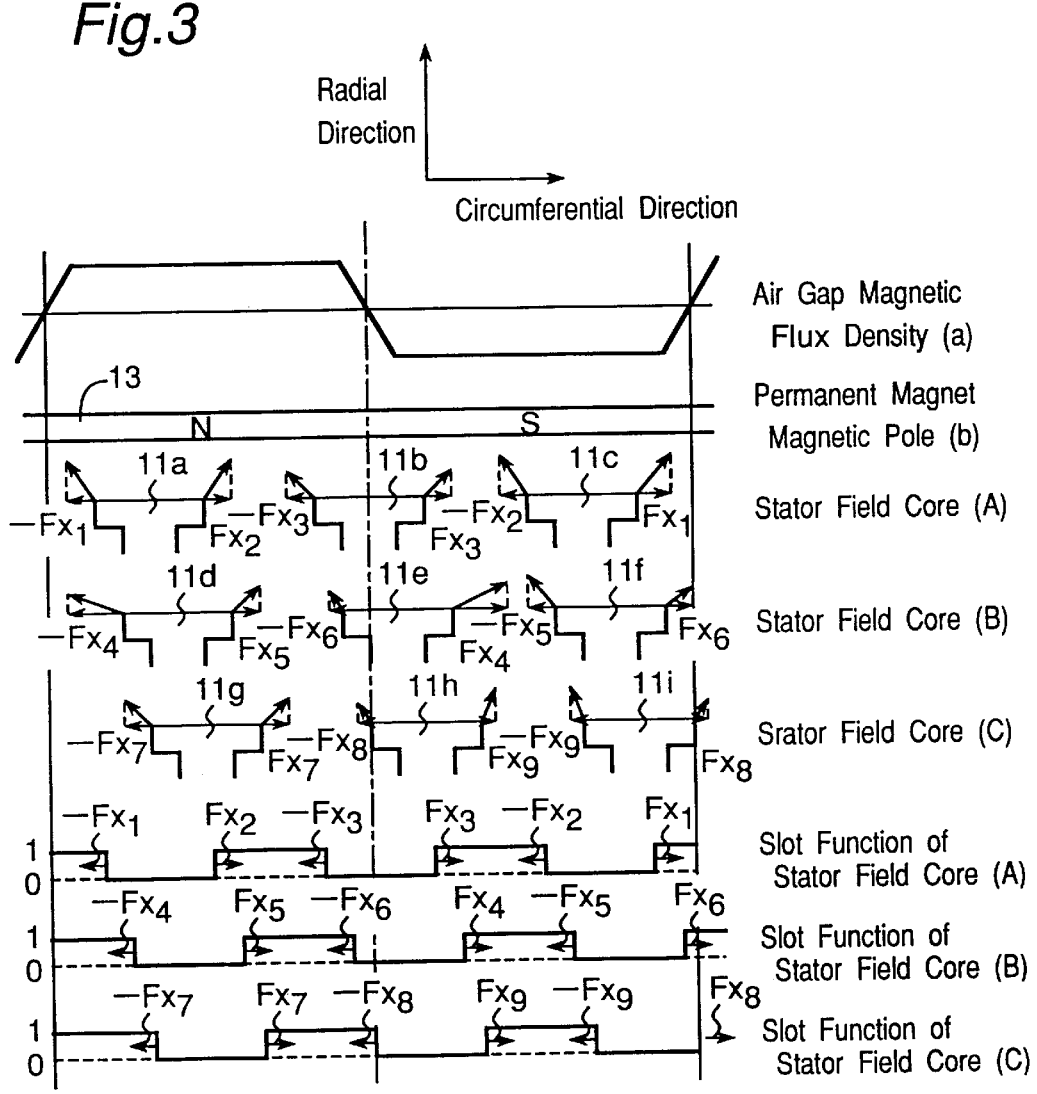
FIG. 3 is a chart for explaining the principle that no cogging torque is generated in the permanent magnet motor shown in FIG. 1.

FIG. 3 shows a relative positional relation between the permanent magnet magnetic pole 13 and the salient pole section 11a of the stator field core 11. In the graph of a slot function shown in FIG. 3, the function value of the winding slot 17 is defined as one, and the function value of the stator field cores 11 is defined as zero. In the graph of the stator field cores (A) through (C) are shown forces F exerted on the stator field cores 11. An attracting force is exerted between the stator field cores 11 and the permanent magnet magnetic poles 13, and the rotor 12 is rotated by this attracting force. A cogging torque is generated due to an unbalance of a component force in the circumferential direction of this attracting force.

A force exerted on a pair of magnetic poles will be described below with a force in the rotor circumference direction expressed by Fx with reference to FIG. 3. In regard to the iron core 11a and an iron core 11c of the stator field core (A), a force $-Fx_1$ and a force $Fx_1$ in the rotor circumference direction are balanced with each other, and a force $Fx_2$ and a force $-Fx_2$ in the rotor circumference direction are balanced with each other. Further, in regard to an iron core 11b, a force $-Fx_3$ and a force $Fx_3$ in the rotor circumference direction are balanced with each other. Therefore, the force in the rotor circumference direction, i.e., the cogging torque is not generated in the stator field core (A).

When the stator field core 11 and the permanent magnet rotor 12 rotate relatively to each other to enter into a state of a stator field core (B), a force $-Fx_4$ and a force $Fx_4$ in the rotor circumference direction are balanced with each other in regard to an iron core 11d and an iron core 11e. In regard to the iron core 11d and an iron core 11f, a force $Fx_5$ and a force $-Fx_5$ in the rotor circumference direction are balanced with each other. In regard to the iron core 11e and the iron core 11f, a force $-Fx_6$ and a force $Fx_6$ in the circumferential direction are balanced with each other. Therefore, the force in the circumferential direction, i.e., the cogging torque is not generated.

When this is considered in terms of the slot function, a negative force is exerted in the rotor circumference direction at a point where the slot function changes from one to zero, while a positive force is exerted in the rotor circumference direction at a point where the slot function changes from zero to one. Therefore, if the slot function on the north pole side and the slot function on the south pole side are identical to each other when the function value of the slot function on the south pole side is changed from zero to one with the slot function on the north pole side fixed, no force is consequently generated in the circumferential direction. Therefore, in an attempt at generating such an effect in this motor, assuming that P is an integer not smaller than one, then the number of the permanent magnet magnetic poles 13 (magnetic pole count) of the rotor 12 is set to 2P and the number of the salient pole sections 11a (salient pole count) of the stator field core 11 is set to 3P. Assuming that N is an odd number not smaller than three, then the slot angle of the salient pole section 11a of the stator field core 11 is set to 1/N of the angle corresponding to the length in the rotor circumference direction of the permanent magnet magnetic pole 13.

Although the construction of the motor of the 6-pole 9-slot type motor is shown in this first embodiment, the present invention is not limited to such a motor, and it is a matter of course that it can be similarly applied to, for example, motors of a 4-pole 6-slot type, an 8-pole 12-slot type, a 10-pole 15-slot type and the like.

Although this first embodiment employs the permanent magnet magnetic poles 13 as the magnetic poles of the rotor 12, the magnetic poles are not always required to be permanent magnets, and it may be a one which has its surface covered with a resin or iron and is internally provided with a permanent magnet or a one in which a magnetic pole is formed by flowing a current by a winding.

(Second Embodiment)

Figure 4A:
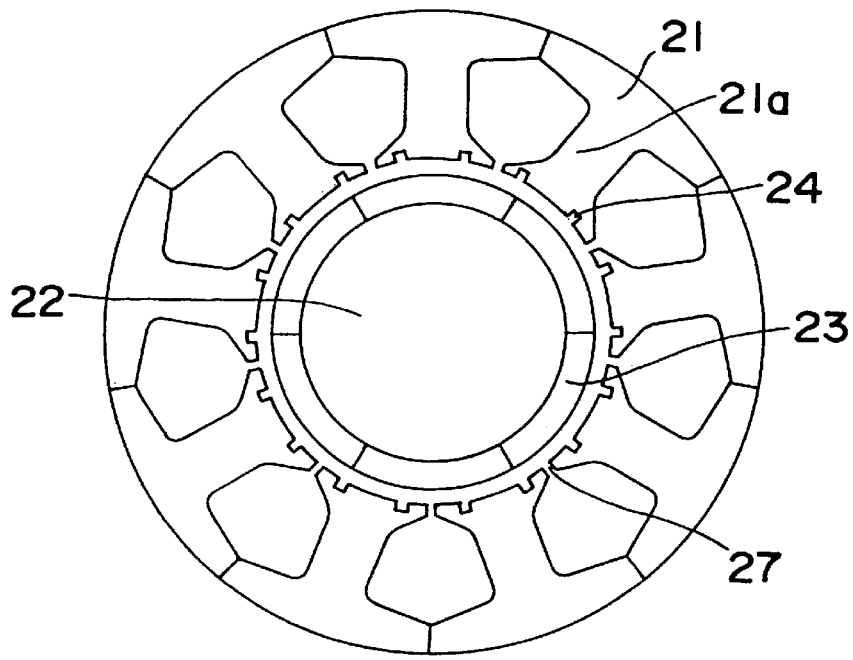
FIG. 4A is a view showing the structure of a permanent magnet motor according to a second embodiment of the present invention.
Figure 5:
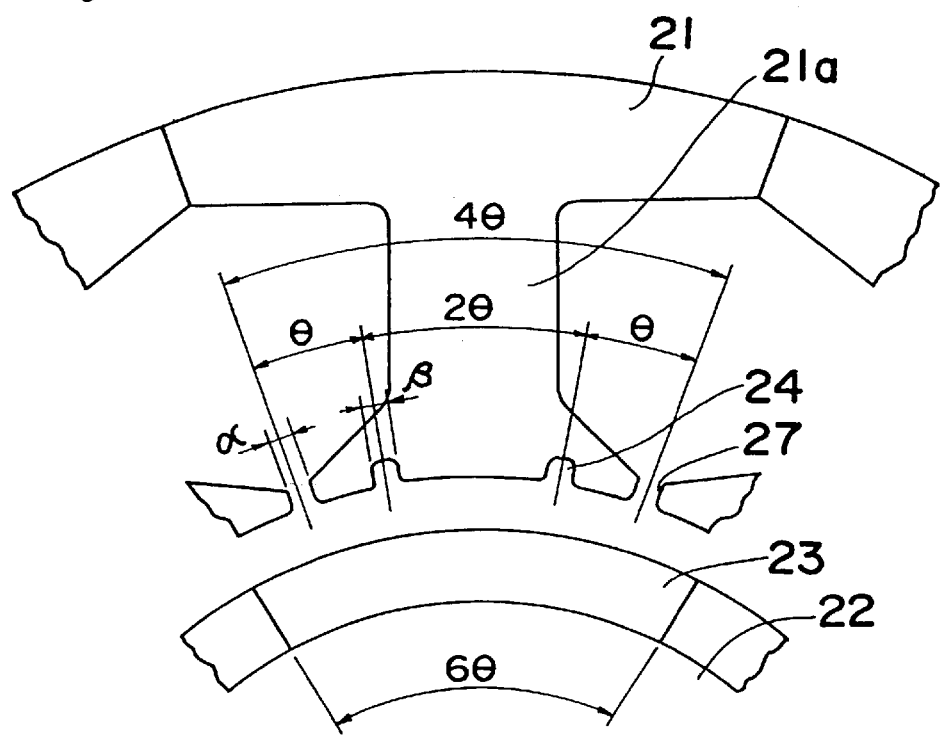
FIG. 5 is an enlarged view of the essential part of the permanent magnet motor shown in FIG. 4A.

FIG. 4A shows a sectional view of a permanent magnet motor of a 6-pole 9-slot type provided with a supplemental groove positioned in portions which belong to the tip portion of the salient pole section and are separated from the center of the winding slot by an angle of 10° and 30° in the circumferential direction. FIG. 5 shows an enlarged view of the essential part of this motor.

As shown in FIG. 4A, this motor is provided with a stator in which nine stator field cores 21 are assembled into a circular arc shape. Each of the stator field cores 21 (stator) is provided with a salient pole section 21a which is formed so as to protrude toward the center side (rotor center side) of the motor. A rotor 22 (permanent magnet rotor) is arranged in a space inside the ring-shaped stator, and six permanent magnet magnetic poles 23 are fixed in a circular arc shape on the peripheral portion of this rotor 22. A winding is wound around a winding slot 27 provided between adjacent two stator field cores 21. When a current is made to flow through this winding, the rotor 22 rotates to drive the motor. A tip portion of each salient pole section 21a, i.e., its surface facing the rotor 22 (permanent magnet magnetic pole 23) is provided with two supplemental grooves 24.

As shown in FIG. 5, the slot angle θ of the salient pole section 21a is defined as an angle between a straight line which extends through the center (rotor center) of the rotor 22 and the center of the supplemental groove 24 and a straight line which extends through the rotor center and the center of the winding slot 27 of the stator field cores 21. In this motor, an angle of the permanent magnet magnetic pole 23 of the rotor 22 with respect to the length (circular arc portion) in the rotor circumference direction is set to 6θ, an angle of the stator field core 21 with respect to the length in the rotor circumference direction is set to 4θ, and an angle corresponding to an interval in the rotor circumference direction between both the supplemental grooves 24 of the salient pole section 21a is set to 2θ.

Figure 4B:
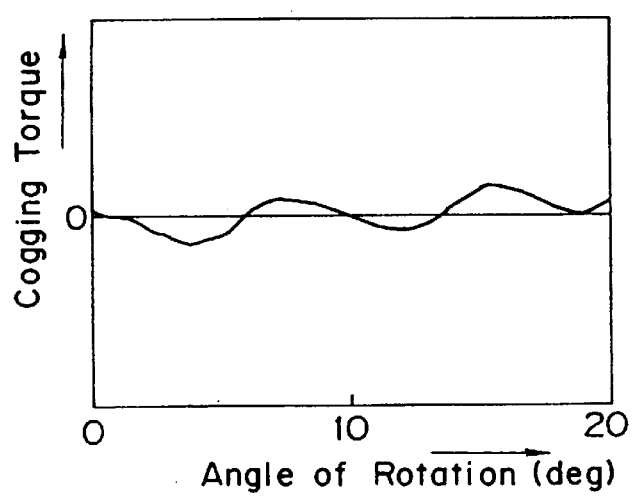
FIG. 4B is a graph showing a relation between an angle of rotation and a cogging torque in the permanent magnet motor shown in FIG. 4A.
Figure 6:
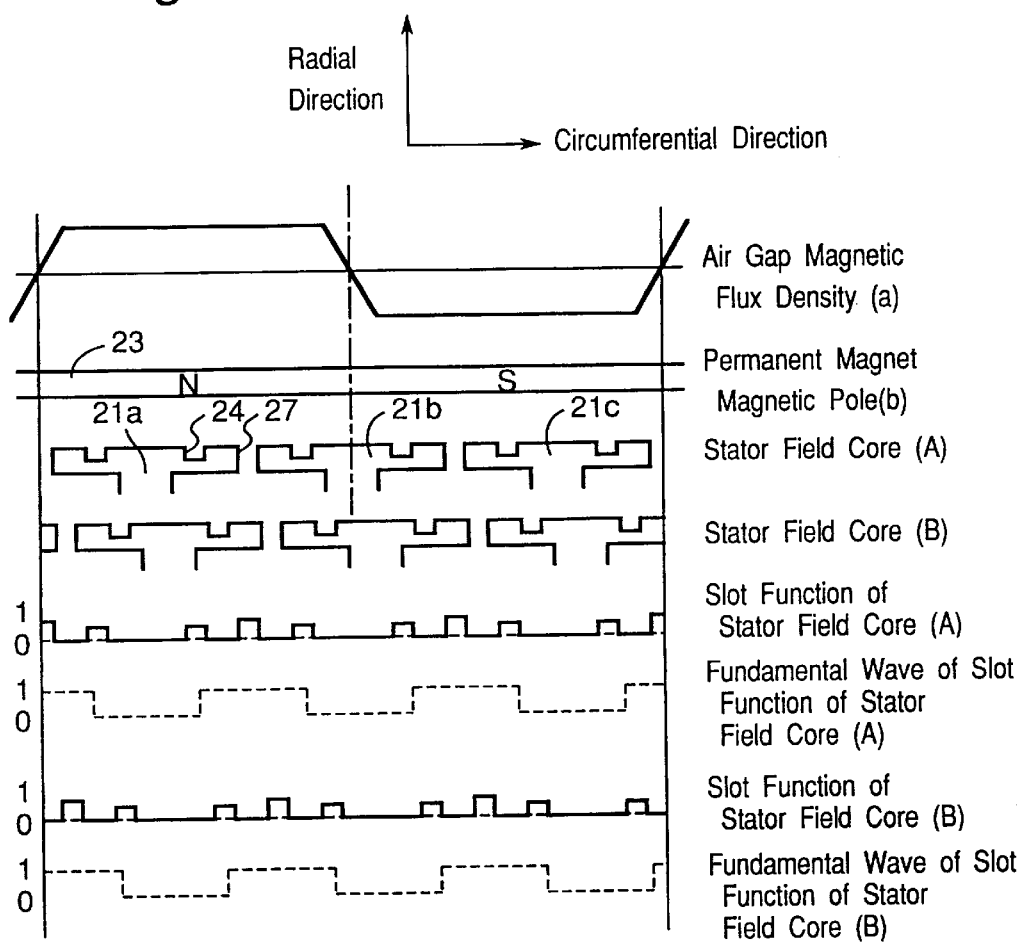
FIG. 6 is a chart for explaining the principle that no cogging torque is generated in the permanent magnet motor shown in FIG. 4A.

FIG. 6 shows a relative positional relation between the permanent magnet magnetic pole 23 and the salient pole section 21a of the stator field core 21. If the slot function and the fundamental wave of the slot function shown in FIG. 6 are combined with each other, a slot function which causes almost no cogging torque as shown in FIG. 4B can be obtained. That is, by providing the salient pole section 21a of the stator field core 21 with the supplemental grooves 24, the fundamental wave component of the cogging torque can be removed, and accordingly the cogging torque which is actually generated is only the higher harmonic component of the slot function. As described above, in the motor of this second embodiment, the cogging torque is reduced by virtue of the provision of the supplemental grooves 24.

In this motor, assuming that P is an integer not smaller than one, then the number of the permanent magnet magnetic poles 23 (magnetic pole count) of the rotor 22 is set to 2P and the number of the salient pole sections 21a (salient pole count) of the stator field core 21 is set to 3P. As stated before, the salient pole sections 21a of the stator field cores 21 are each provided with two supplemental grooves 24. Assuming that an angle between the magnetic poles is 4θ, then the centers of the two supplemental grooves 24 are arranged in a position at an angle θ and a position at an angle 3θ with respect to the center of the winding slot 27 when viewed in the rotor circumference direction.

In the motor of the second embodiment, a width β of the supplemental groove 24 in the rotor circumference direction is set within a range of not smaller than 0.5 time to not greater than 1.5 times the width α of the winding slot 27 in the rotor circumference direction. With this arrangement, an effect of cancelling the fundamental wave of the cogging torque by the supplemental grooves 24 is improved, so that the cogging torque is further reduced. In this case, it is specifically preferable to set the width α of the winding slot 27 equal to the width β of the supplemental groove 24, namely satisfying α=β.

When driving this permanent magnet motor by a sine wave, the torque pulsation can be further reduced by skewing (giving a bias to) the permanent magnet magnetic pole 23 by one half of a slot pitch γ, or by making the skew angle one half of the slot pitch γ.

Figure 7:
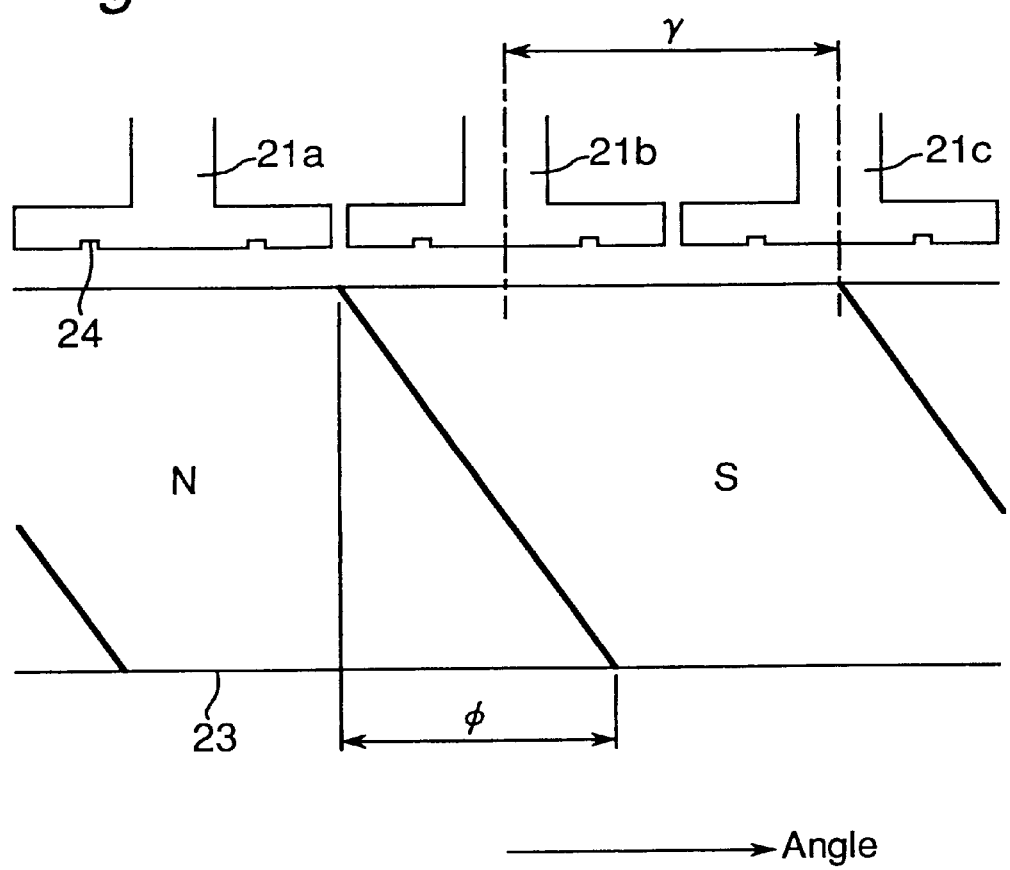
FIG. 7 is a view for explaining a skew angle according to the present invention.

FIG. 7 is a view for explaining the skew angle, and φ represents the skew angle and γ represents the slot pitch in FIG. 7.

Figure 8:
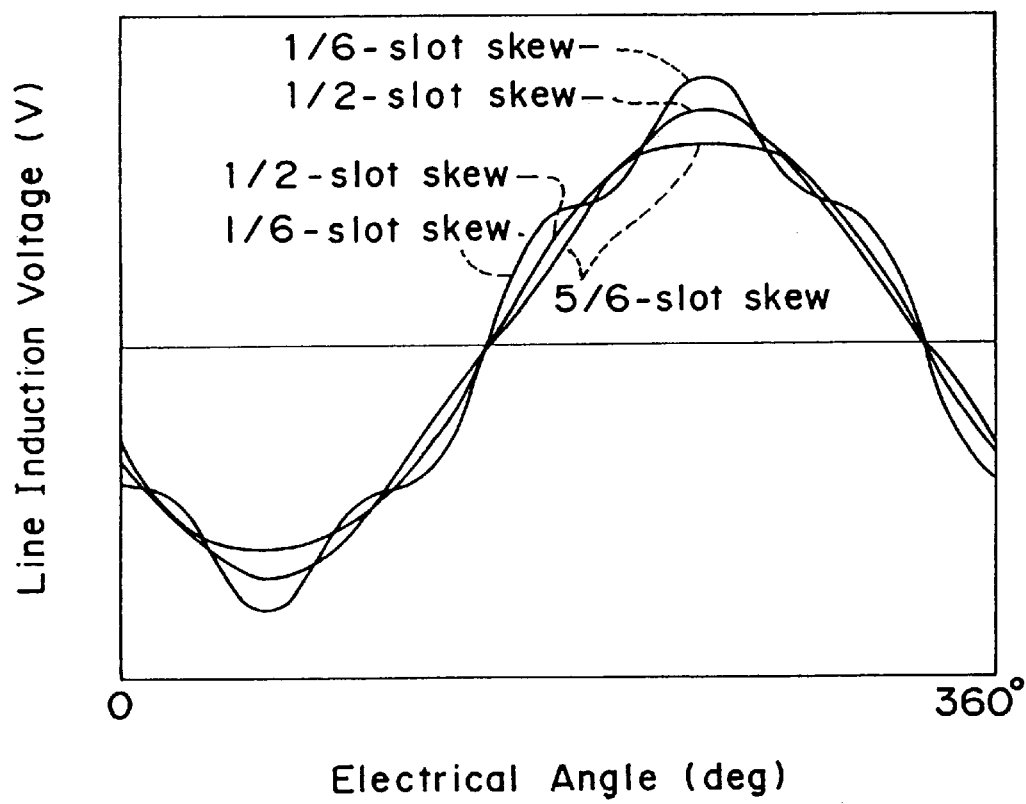
FIG. 8 is a graph showing the variation characteristic of a line induction voltage in a case where the skew angle of the present invention is varied in a variety of ways.

FIG. 8 is a graph showing line induction voltage waveforms when the skew angle is varied. When a rectangular wave drive is used as a control system of the permanent magnet motor, no torque pulsation is generated so long as a torque pulsation characteristic (corresponding to the line induction voltage waveform) owned by the permanent magnet motor is flat in a control position corresponding to the flat portion of the rectangular wave. The line induction voltage waveform, which also varies depending on the drive electrification system of the rectangular wave, becomes a trapezoidal wave as the skew angle is increased as is apparent from FIG. 8, when an effect that the torque pulsation is reduced and the cogging torque is reduced is generated. As stated before, in the motor of the second embodiment, the magnetic pole count of the rotor 22 is set to 2P (P is an integer not smaller than one) and the is salient pole count of the stator field cores 21 is set to 3P. When the rectangular wave drive of a 120°-electrification system is used as the control system, it is preferable to make the permanent magnet rotor 22 have a structure in which it is skewed within a range of not smaller than 0.4 time to not greater than one time the slot pitch of the stator field cores 21. It is specifically preferable to make 5/6 times the skew.

By performing such a skew on the permanent magnet motor whose cogging torque is reduced by the supplemental grooves 24, the cogging torque can be further reduced.

Although the motor of this second embodiment employs the permanent magnet magnetic poles 23 as the magnetic poles of the rotor 22, the magnetic poles are not limited to the permanent magnets. For example, it may be a one which has its surface covered with a resin or iron and is internally provided with a permanent magnet or a one in which a magnetic pole is formed by flowing a current by a winding.

(Third Embodiment)

Figure 10A:
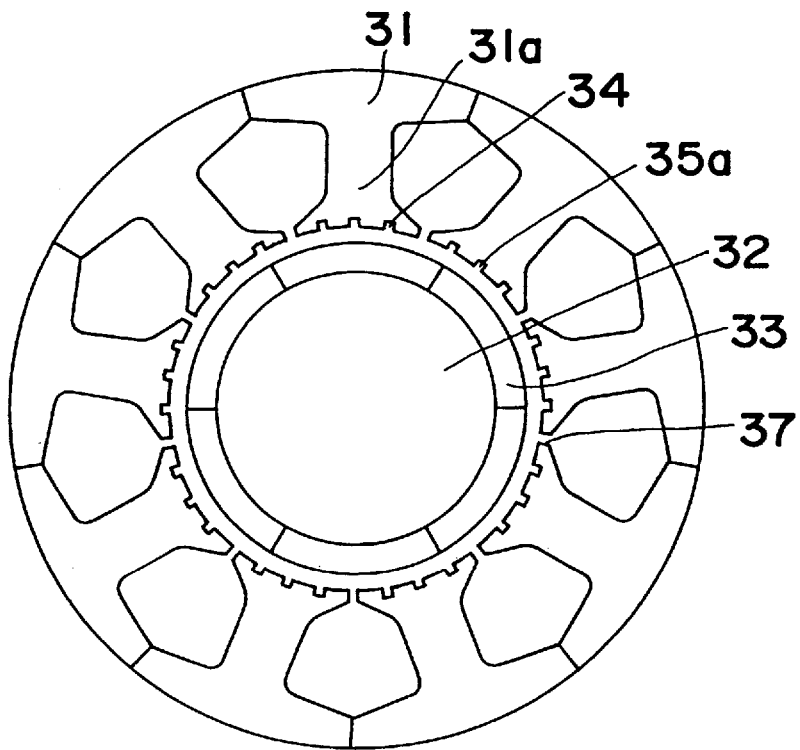
FIG. 10A is a view showing the structure of one permanent magnet motor of the third embodiment of the present invention.

In a motor of this third embodiment, each salient pole section is provided with three or more supplemental grooves as shown in, for example, FIG. 10A.

FIG. 9 shows a relative positional relation between the permanent magnet magnetic pole 33 and the salient pole section 31a of the stator field core 31 provided with supplemental grooves 34. Then, in the graph of the slot function in FIG. 9, the slot function value is defined as one in regard to the winding slot, and the slot function value is defined as zero in regard to the iron core. Eventually, if the slot function is drawn and the fundamental wave of the slot function is drawn, a slot function having no cogging torque as shown in FIG. 6 results.

That is, by providing the salient pole section 31a of this stator field core 31 with the supplemental grooves 34 and 35 as shown in FIG. 9, the fundamental wave component of the cogging torque can be removed. In this case, the cogging torque which is actually generated is the higher harmonic component due to the slot functions of the supplemental grooves 34 and the supplemental groove 35, generating an effect that the cogging torque is reduced. In the motor of this third embodiment, assuming that P is an integer not smaller than one, then the magnetic pole count of the rotor 32 (permanent magnet rotor) is set to 2P and the salient pole count of the stator field cores 31 is set to 3P. Then, the salient pole section 31a of each stator field core 31 is provided with three or more supplemental grooves 34 and 35. In this case, assuming that an angle corresponding to the length in the rotor circumference direction of the stator field core 31 is 4θ, then the centers of the two supplemental grooves among the supplemental grooves provided at the salient pole section 31a of the stator field core 31 are arranged in positions at angles of θ and 3θ with respect to the center of the winding slot when viewed in the rotor circumference direction, and the other supplemental grooves are each arranged in an arbitrary position.

In the motor of the third embodiment, the width β in the rotor circumference direction of the supplemental groove 34 is set within a range of not smaller than 0.5 time to not greater than 1.5 times the width α in the rotor circumference direction of the winding slot 37 of the stator field cores 31 facing the rotor 32. With this arrangement, an effect of cancelling the fundamental wave of the cogging torque by the supplemental grooves 34 is improved, so that the cogging torque is further reduced. In this case, it is specifically preferable to set the width α of the winding slot 37 equal to the width β of the supplemental grooves 34, namely satisfying α=β.

When driving this permanent magnet motor by a sine wave, the torque pulsation can be further reduced by skewing the permanent magnet magnetic pole 33 by one half of the slot pitch, or by making the skew angle one half of the slot pitch.

A variety of preferable configurations of the supplemental groove in the motor of this third embodiment can be considered, and a representative configuration of the supplemental groove will be described below.

Figure 10B:
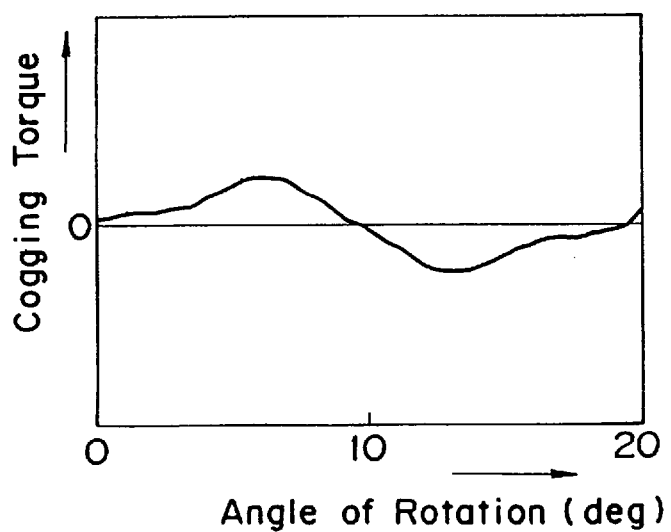
FIG. 10B is a graph showing a relation between an angle of rotation and a cogging torque in the permanent magnet motor shown in FIG. 10A.

In a motor of the 6-pole 9-slot type shown in FIG. 10A, the salient pole section 31a of each stator field core 31 is provided with three supplemental grooves 34, 35a and 34 for the purpose of reducing the cogging torque, and the supplemental grooves are arranged in positions at angles of 10°, 20° and 30°, respectively, with respect to the winding slot center. The supplemental groove 35a arranged in the middle of the three supplemental grooves 34, 35a and 34 of the salient pole section 31a is positioned at the center of the salient pole section 31a when viewed in the rotor circumference direction. FIG. 10B shows a variation characteristic of the cogging torque of the motor shown in FIG. 10A with respect to the angle of rotation.

Figure 11A:
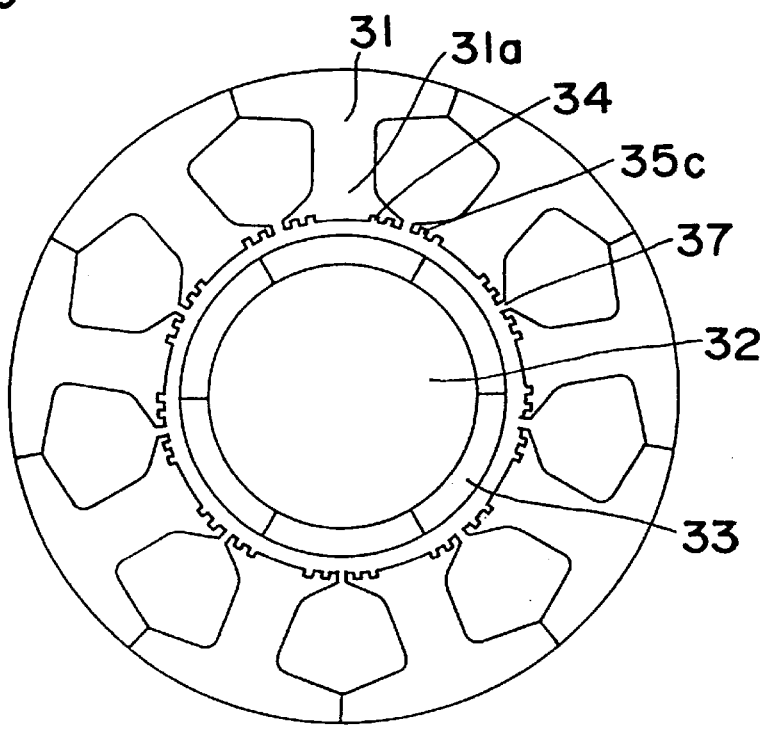
FIG. 11A is a view showing the structure of another permanent magnet motor of the third embodiment of the present invention.
Figure 11B:
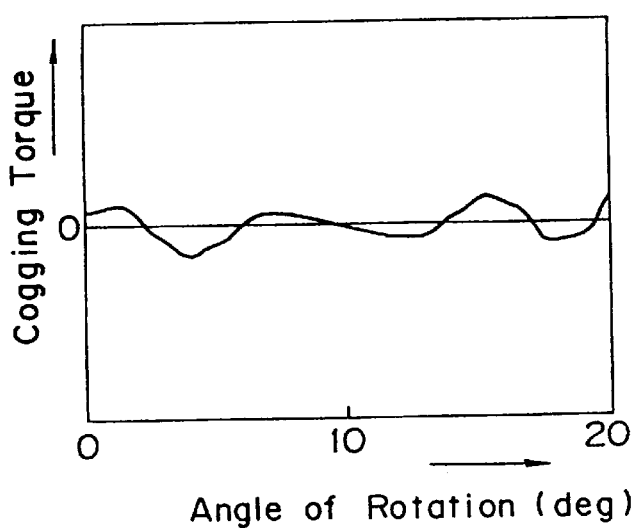
FIG. 11B is a graph showing a relation between an angle of rotation and a cogging torque in the permanent magnet motor shown in FIG. 11A.

In a motor of the 6-pole 9-slot type shown in FIG. 11A, the salient pole section 31a of each stator field core 31 is provided with four supplemental grooves 35c, 34, 34 and 35c for the purpose of reducing the cogging torque, and the supplemental grooves are arranged in positions at angles of 5°, 10°, 30° and 35°, respectively, with respect to the winding slot center. FIG. 11B shows a variation characteristic of the cogging torque of the motor shown in FIG. 11A with respect to the angle of rotation.

Figure 12A:
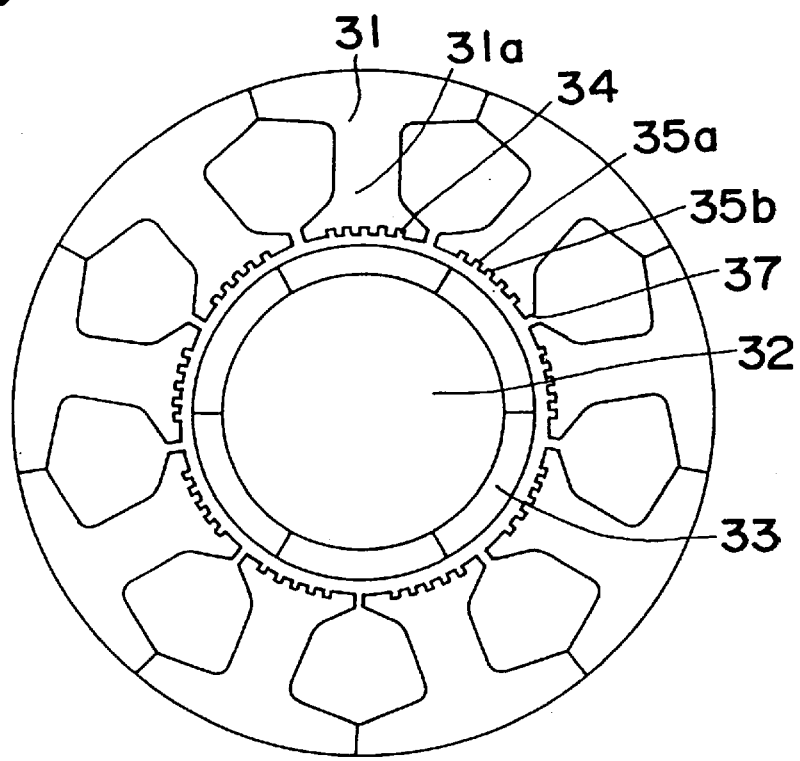
FIG. 12A is a view showing the structure of another permanent magnet motor of the third embodiment of the present invention.
Figure 12B:
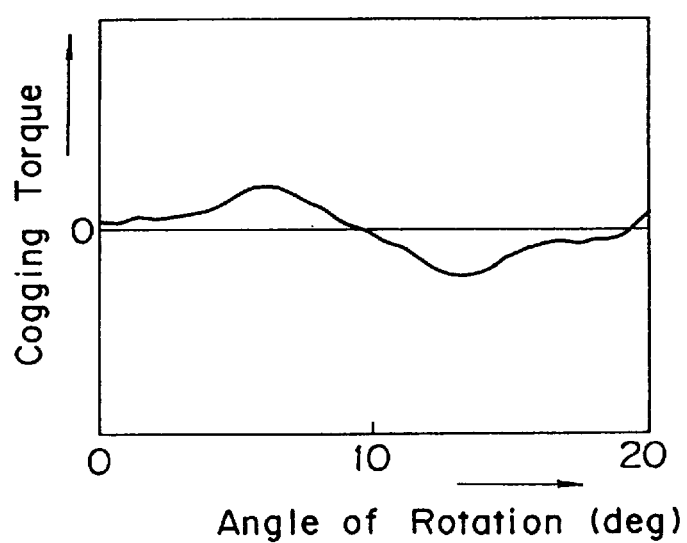
FIG. 12B is a graph showing a relation between an angle of rotation and a cogging torque in the permanent magnet motor shown in FIG. 12A.

In a motor of the 6-pole 9-slot type shown in FIG. 12A, the salient pole section 31a of each stator field core 31 is provided with five supplemental grooves 34, 35a, 35b, 35a and 34 for the purpose of reducing the cogging torque, and the supplemental grooves are arranged in positions at angles of 10°, 15°, 20°, 25° and 30°0, respectively, with respect to the winding slot center. FIG. 12B shows a variation characteristic of the cogging torque of the motor shown in FIG. 12A with respect to the angle of rotation.

Figure 13A:
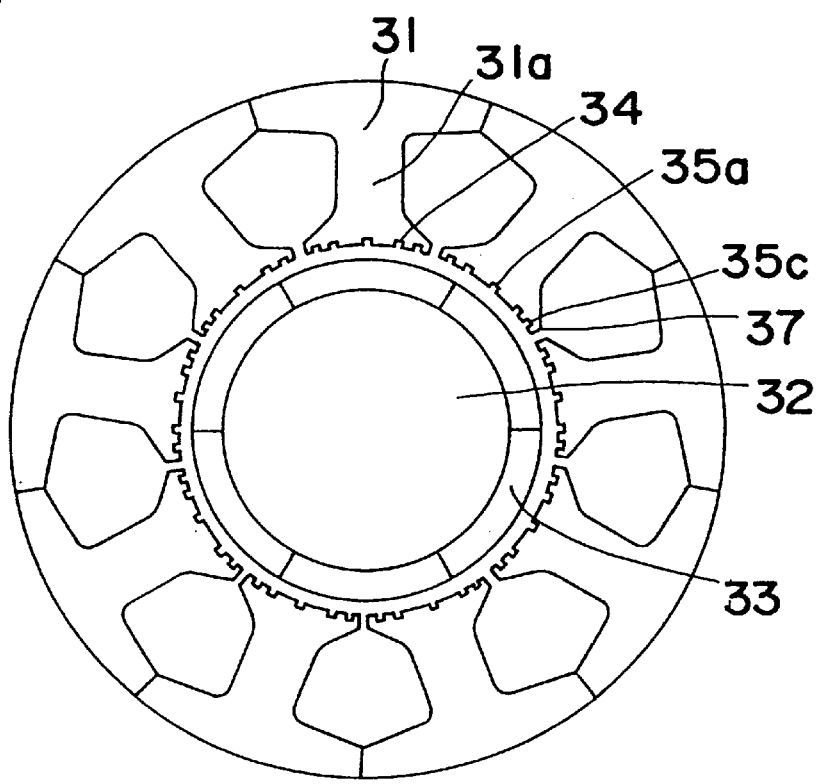
FIG. 13A is a view showing the structure of another permanent magnet motor of the third embodiment of the present invention.
Figure 13B:
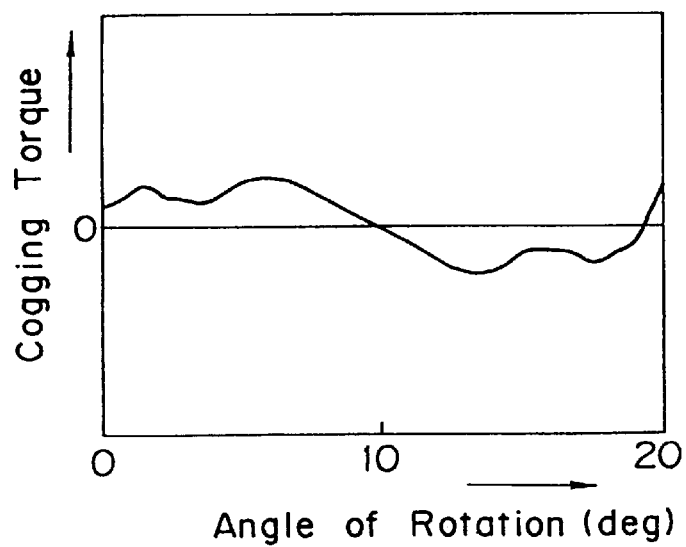
FIG. 13B is a graph showing a relation between an angle of rotation and a cogging torque in the permanent magnet motor shown in FIG. 13A.

In a motor of the 6-pole 9-slot type shown in FIG. 13A, the salient pole section 31a of each stator field core 31 is provided with five supplemental grooves 35c, 34, 35a, 34 and 35c for the purpose of reducing the cogging torque, and the supplemental grooves are arranged in positions at angles of 5°, 10°, 20°, 30° and 35°, respectively, with respect to the winding slot center. FIG. 13B shows a variation characteristic of the cogging torque of the motor shown in FIG. 13A with respect to the angle of rotation.

Figure 14A:
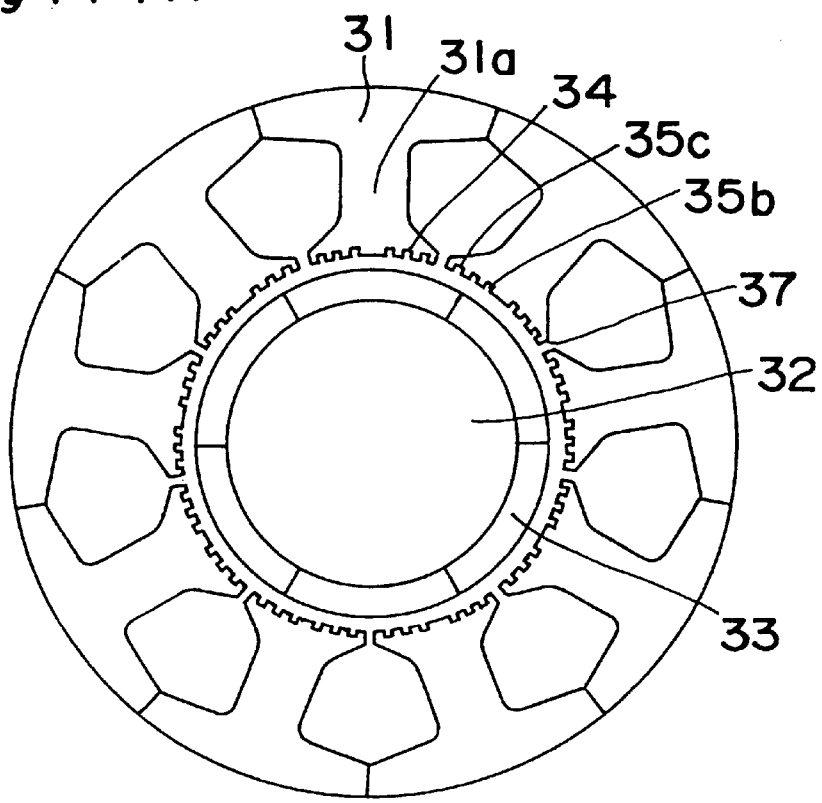
FIG. 14A is a view showing the structure of another permanent magnet motor of the third embodiment of the present invention.
Figure 14B:
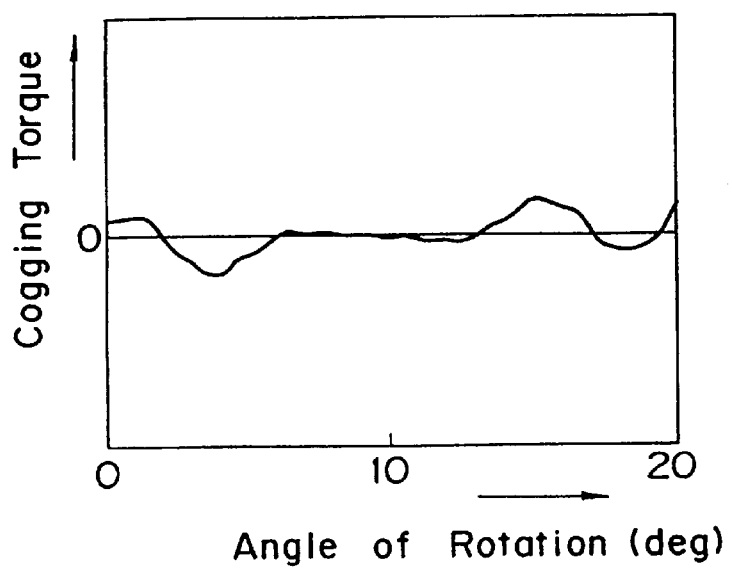
FIG. 14B is a graph showing a relation between an angle of rotation and a cogging torque in the permanent magnet motor shown in FIG. 14A.

In a motor of the 6-pole 9-slot type shown in FIG. 14A, the salient pole section 31a of each stator field core 31 is provided with six supplemental grooves 35c, 34, 35b, 35b, 34 and 35c for the purpose of reducing the cogging torque, and the supplemental grooves are arranged in positions at angles of 5°, 10°, 15°, 25°, 30° and 35°, respectively, with respect to the winding slot center. FIG. 14B shows a variation characteristic of the cogging torque of the motor shown in FIG. 14A with respect to the angle of rotation.

Figure 15A:
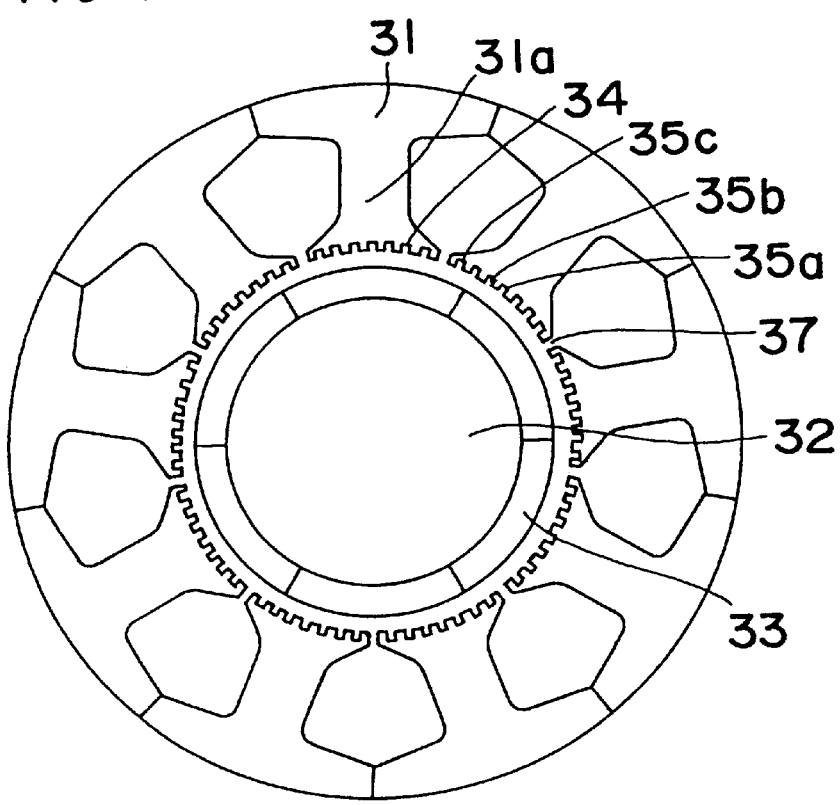
FIG. 15A is a view showing the structure of another permanent magnet motor of the third embodiment of the present invention.
Figure 15B:
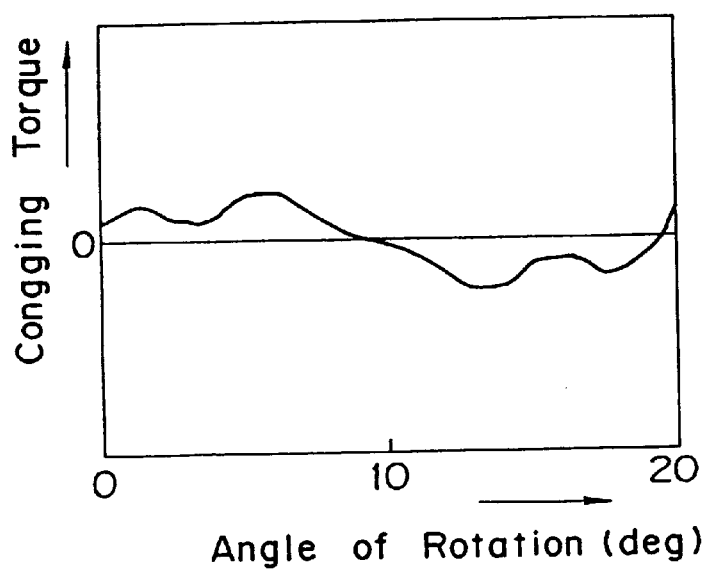
FIG. 15B is a graph showing a relation between an angle of rotation and a cogging torque in the permanent magnet motor shown in FIG. 15A.

In a motor of the 6-pole 9-slot type shown in FIG. 15A, the salient pole section 31a of each stator field core 31 is provided with seven supplemental grooves 35c, 34, 35b, 35a, 35b, 34 and 35c for the purpose of reducing the cogging torque, and the supplemental grooves are arranged in positions at angles of 5°, 10°, 15°, 20°, 25°, 30° and 35°, respectively, with respect to the winding slot center. FIG. 15B shows a variation characteristic of the cogging torque of the motor shown in FIG. 15A with respect to the angle of rotation.

(Fourth Embodiment)

Figure 16:
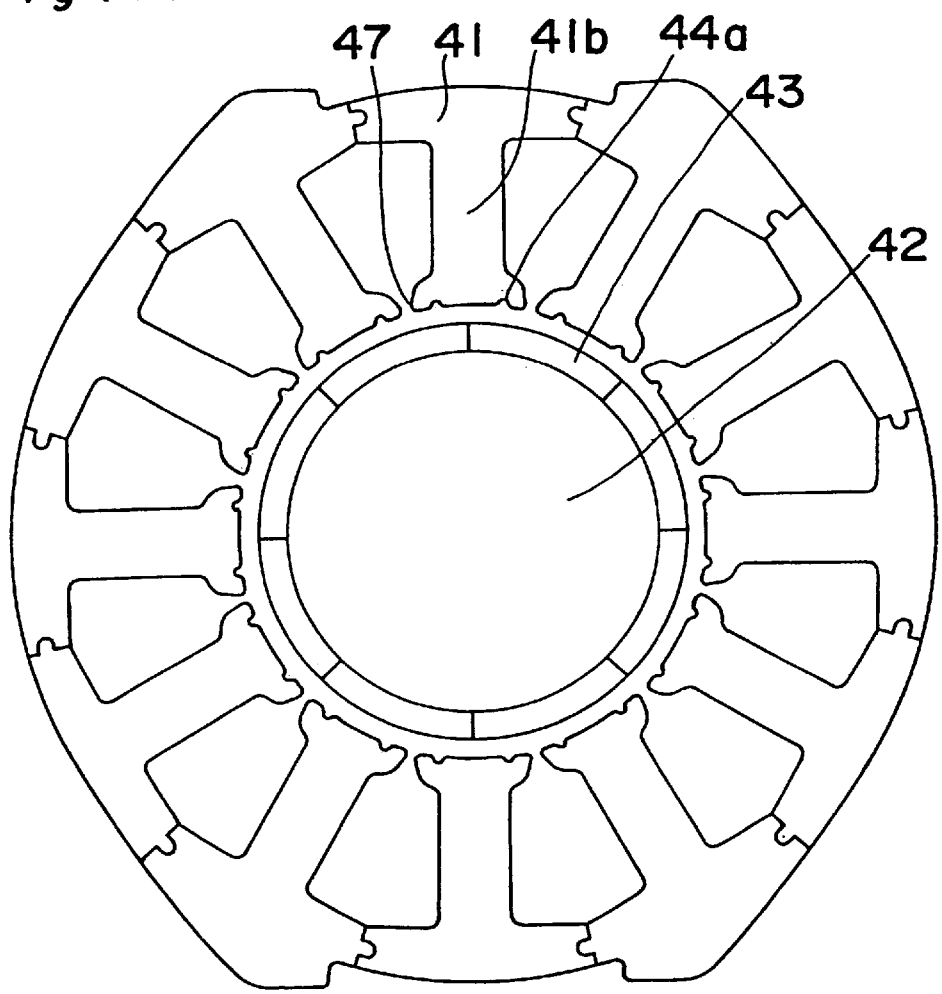
FIG. 16 is a view showing the structure of a permanent magnet motor according to a fourth embodiment of the present invention.
Figure 17:
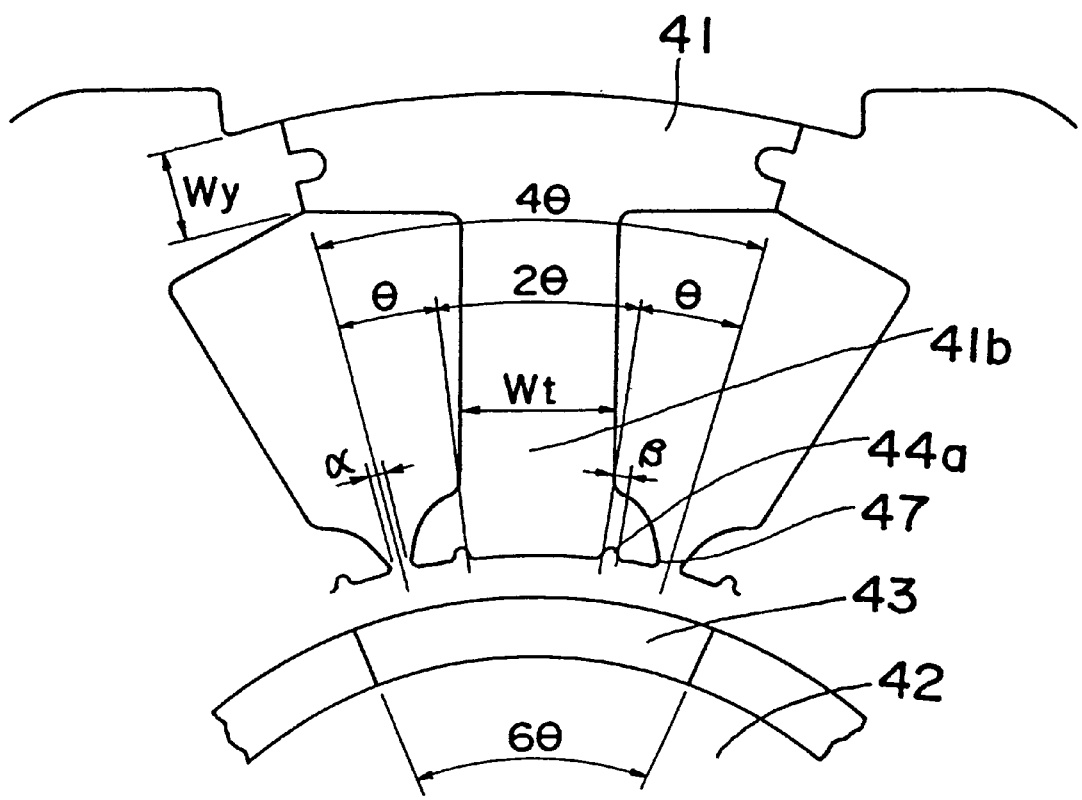
FIG. 17 is an enlarged view of the essential part of the permanent magnet motor shown in FIG. 16.

FIG. 16 is a sectional view of a permanent magnet motor of an 8-pole 12-slot type according to a fourth embodiment of the present invention. FIG. 17 is an enlarged view of the essential part of the motor shown in FIG. 16.

As shown in FIG. 16 and FIG. 17, in this motor, a salient pole section 41b of each stator field core 41 is provided with two supplemental grooves 44a for the purpose of reducing the cogging torque, and these two supplemental grooves 44a are arranged so that the end portion on the salient pole magnetic pole center side is positioned at angles of 7.5° and 22.5°, respectively, with respect to the winding slot center when viewed in the rotor circumference direction.

This motor is provided with a stator in which twelve stator field cores 41 are assembled into a circular arc shape or a semicylindrical shape. Then, each stator field core 41 (stator) is provided with a salient pole section 41b which is formed so as to protrude toward the center side (rotor center side) of the motor. A rotor 42 (permanent magnet rotor) is arranged in a space inside the ring-shaped stator, and eight permanent magnet magnetic poles 43 are fixed in a circular arc shape on the peripheral portion of this rotor 42. A winding is wound around a winding slot 47 provided between adjacent two stator field cores 41. When a current is made to flow through this winding, the rotor 42 rotates to drive the motor. A tip portion of each salient pole section 41b, i.e., its surface (opposite surface) facing the rotor 42 (permanent magnet magnetic pole 43) is provided with two supplemental grooves 44a.

Then, in this motor, as is apparent from FIG. 17, the slot angle $\theta$ of the salient pole section 41b is defined as an angle between a straight line which extends through the center (rotor center) of the rotor 42 and an end portion on the salient pole section center side of the supplemental groove 44a and a straight line which extends through the rotor center and the center of the winding slot 47 of the stator field cores 41. In this motor, an angle of the rotor 42 with respect to the length (circumference arc portion) in the rotor circumference direction of each permanent magnet magnetic pole 43 is set to $6\theta$, an angle of the stator field core 41 with respect to the length in the rotor circumference direction is set to $4\theta$, and an angle corresponding to an interval (salient pole magnetic pole interval) in the rotor circumference direction between both the salient pole section center side end portions of both the supplemental grooves 44a of the salient pole section 41b is set to $2\theta$.

Figure 18:
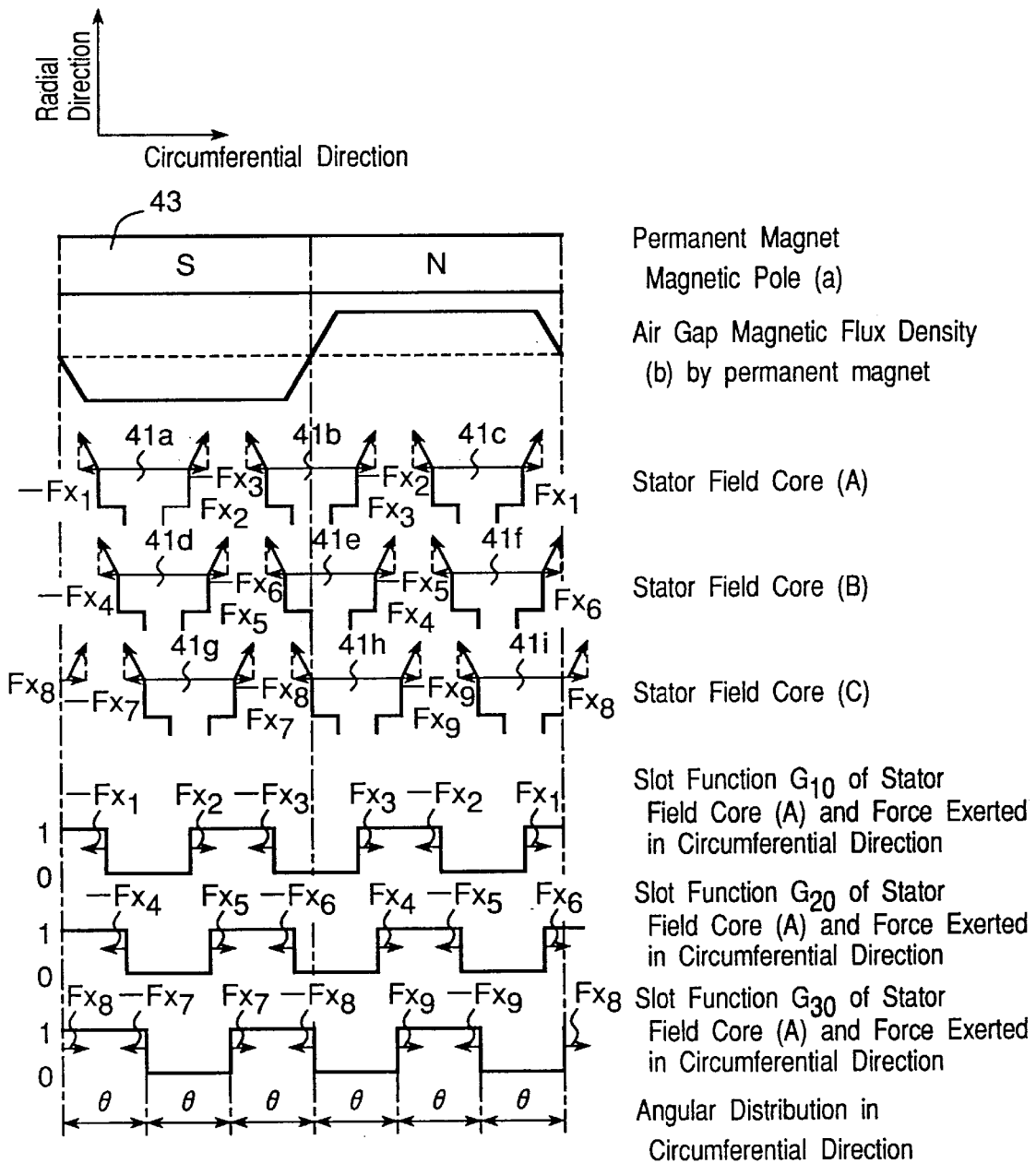
FIG. 18 is a chart for explaining the principle that no cogging torque is generated in the permanent magnet motor shown in FIG. 16.

FIG. 18 shows a principle in removing the greatest fundamental wave component when the cogging torque component is subjected to a higher harmonic analysis. FIG. 18 also shows a force F exerted on the stator field cores (A), (B) and (C) when the permanent magnet magnetic pole 43 and the stator field core 41 are changed in position in a permanent magnet motor in which the permanent magnet magnetic pole 43, the salient pole section 41b of the stator field core 41 and a winding slot 47 are arranged in a relative angular relation of $3\theta:\theta:\theta$.

In the graph of the slot function shown in FIG. 18, the function value is defined as one in regard to the slot (winding slot 47), and the function value is defined as zero in regard to the iron core (stator field core 41). In the graph of the stator field cores (A) through (C) is shown a force F exerted on the stator field core 41. In this case, an attracting force is exerted between the stator field core 41 and the permanent magnet magnetic pole 43, and the rotor 42 is rotated by this attracting force. A cogging torque is generated due to an unbalance of the component force in the circumferential direction of this attracting force.

A force exerted on a pair of magnetic poles will be described below with the force in the rotor circumference direction expressed by Fx with reference to FIG. 18. In regard to the iron core 41a and the iron core 41c of the stator field core (A), a force $-Fx_1$ and a force $Fx_1$ in the rotor circumference direction are balanced with each other, and a force $Fx_2$ and a force $-Fx_2$ in the rotor circumference direction are balanced with each other. In regard to an iron core 41b, a force $-Fx_3$ and a force $Fx_3$ in the rotor circumference direction are balanced with each other. Therefore, the force in the rotor circumference direction, i.e., the cogging torque is not generated in the stator field core (A).

In the stator field core (B), a force $-Fx_4$ and a force $Fx_4$ in the rotor circumference direction are balanced with each other in regard to an iron core 41d and an iron core 41e. In regard to the iron core 41d and an iron core 41f, a force $Fx_5$ and a force $-Fx_5$ in the rotor circumference direction are balanced with each other. In regard to the iron core 41e and the iron core 41f, a force $-Fx_6$ and a force $Fx_6$ in the rotor circumference direction are balanced with each other. Therefore, the force in the rotor circumference direction, i.e., the cogging torque is not generated.

Further, in the stator field core (C), a force $-Fx_7$ and a force $Fx_7$ in the rotor circumference direction are balanced with each other in regard to an iron core 41g. In regard to an iron core 41h and an iron core 41i, a force $-Fx_8$, and a force $Fx_8$ in the rotor circumference direction are balanced with each other, and a force $Fx_9$ and a force $-Fx_9$ in the rotor circumference direction are balanced with each other. Therefore, the force in the circumferential direction, i.e., the cogging torque is not generated in the stator field core (C).

When this is considered in terms of the slot function, a negative force is exerted in the rotor circumference direction at a point where the slot function changes from one to zero, while a positive force is exerted in the rotor circumference direction at a point where the slot function changes from zero to one. That is, if the slot function on the north pole side and the slot function on the south pole side are identical to each other when the zero and one of the slot function on the south pole side are exchanged with each other with the slot function on the north pole side fixed, no force is generated in the circumferential direction. With this arrangement, the fundamental wave component of the cogging torque can be removed. However, since there are few salient pole sections 41b which belong to the stator field core 41 and face the permanent magnet magnetic pole 43, and therefore, a torque exerted on the rotor 42 becomes small.

Figure 19:
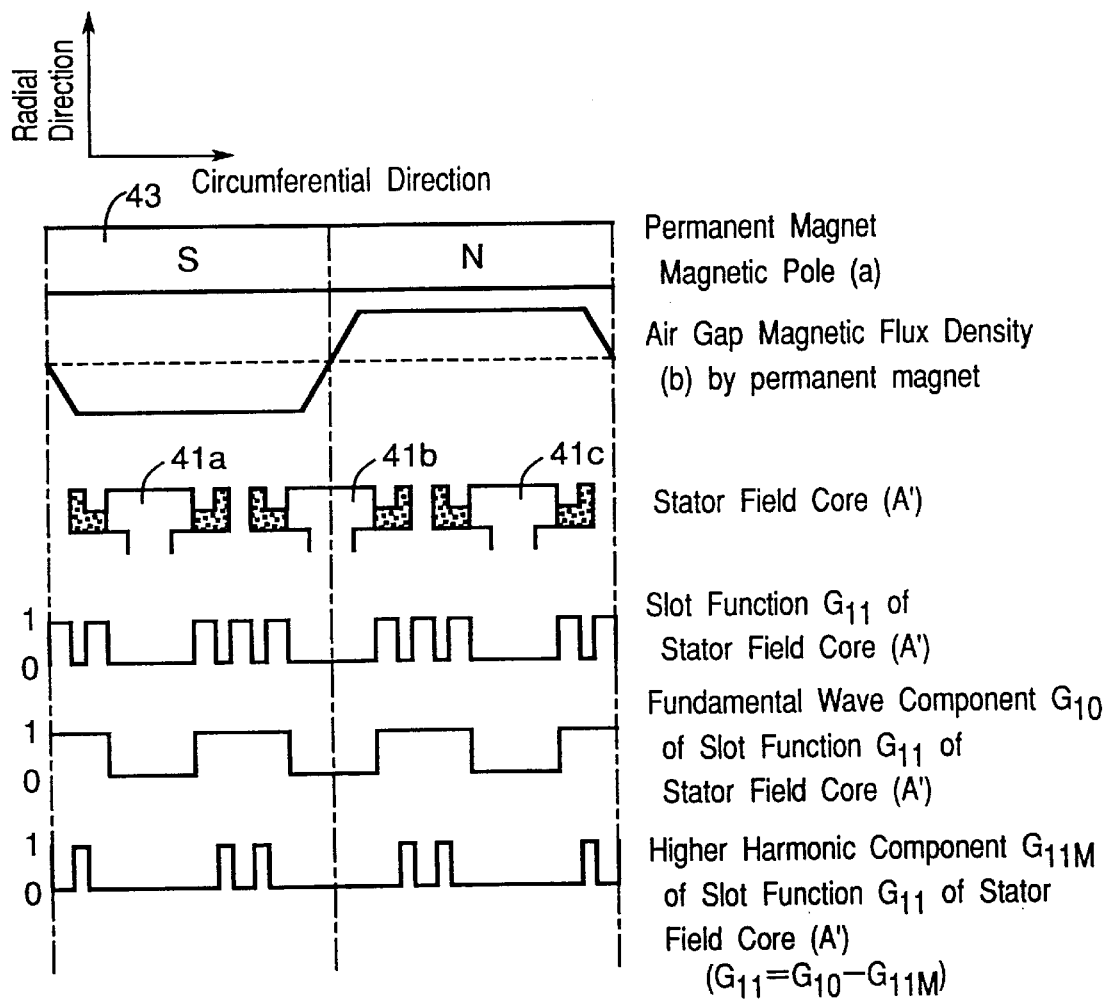
FIG. 19 is a chart for explaining the effect of a modification example of the permanent magnet motor shown in FIG. 16.

FIG. 19 shows a relative positional relation and a relation of force between the permanent magnet magnetic pole 43 and the salient pole section 41b in a motor in which a magnetic field of the permanent magnet magnetic pole 43 is effectively utilized by increasing the area of the salient pole section 41b of the stator field core 41 facing the permanent magnet magnetic pole 43 and a supplemental groove is provided for reducing the cogging torque. In this case, if its slot function $G_{11}$ is drawn, this slot function $G_{11}$ can be separated into a fundamental wave component $G_{10}$ which causes no cogging torque shown in FIG. 18 and a higher harmonic component $-G_{11M}$. Therefore, the greatest fundamental wave component can be removed when the cogging torque component is subjected to a higher harmonic analysis. In this case, the cogging torque which is actually generated is the higher harmonic component of the slot function. With this groove arrangement, the cogging torque is reduced.

In the motor of this fourth embodiment, assuming that P is an integer not smaller than one, then the magnetic pole count of the rotor 42 is set to 2P and the salient pole count of the stator field cores 41 is set to 3P. Then, as stated before, the salient pole section 41b of each stator field core 41 is provided with two supplemental grooves 44a. Assuming that an angle between the salient pole magnetic poles is 4θ, then the two supplemental grooves 44a are arranged so that the end portions on the salient pole magnetic pole center side are positioned at angles of θ and 3θ with respect to the center of the winding slot 47 when viewed in the rotor circumference direction.

In the motor of the fourth embodiment, it is preferred that the width β in the circumferential direction of the supplemental groove 44a is set within a range of not smaller than 0.5 time to not greater than 1.5 times the width a in the rotor circumference direction of the winding slot 47 of the stator field cores 41 facing the rotor 42. With this arrangement, an effect of cancelling the fundamental wave of the cogging torque by the supplemental grooves 44a is improved, so that the cogging torque is further reduced. In this case, it is specifically preferable to set the width a of the winding slot 47 equal to the width α of the supplemental groove 44a, namely satisfying α=β.

In this motor, assuming that the radius of the surface of the stator field core 41 facing the permanent magnet rotor 42 is r, then it is preferred that a width Wt of the salient pole section 41b of the stator field core 41 is set so that Wt>3·r·cos θ. With this arrangement, the flow of the magnetic flux in the salient pole section 41b becomes smooth, so that the distortion of the magnetic flux is reduced and the cogging torque is further reduced.

In this motor, it is preferred that a minimum width Wy of the salient pole section of a yoke section between salient pole sections of the stator field core 41 and the width Wt of the salient pole section 41b are set so that 2·Wy≧Wt. With this arrangement, the flow of the magnetic flux in the salient pole section 41b becomes smooth, so that the cogging torque is further reduced.

Further, when driving this permanent magnet motor by a sine wave, the torque pulsation can be further reduced by skewing the permanent magnet magnetic pole 43 by one half of the slot pitch.

When the control system of the permanent magnet motor is sine wave drive, no torque pulsation is generated if the torque pulsation characteristic owned by the permanent magnet motor is a sine wave too. In this case, it is preferable to skew the permanent magnet rotor 42 within a range of not smaller than 0.4 time to not greater than one time the slot pitch of the stator field core 41, and it is specifically preferable to skew it by 0.5 time or 0.47 time.

(Fifth Embodiment)

Figure 20:
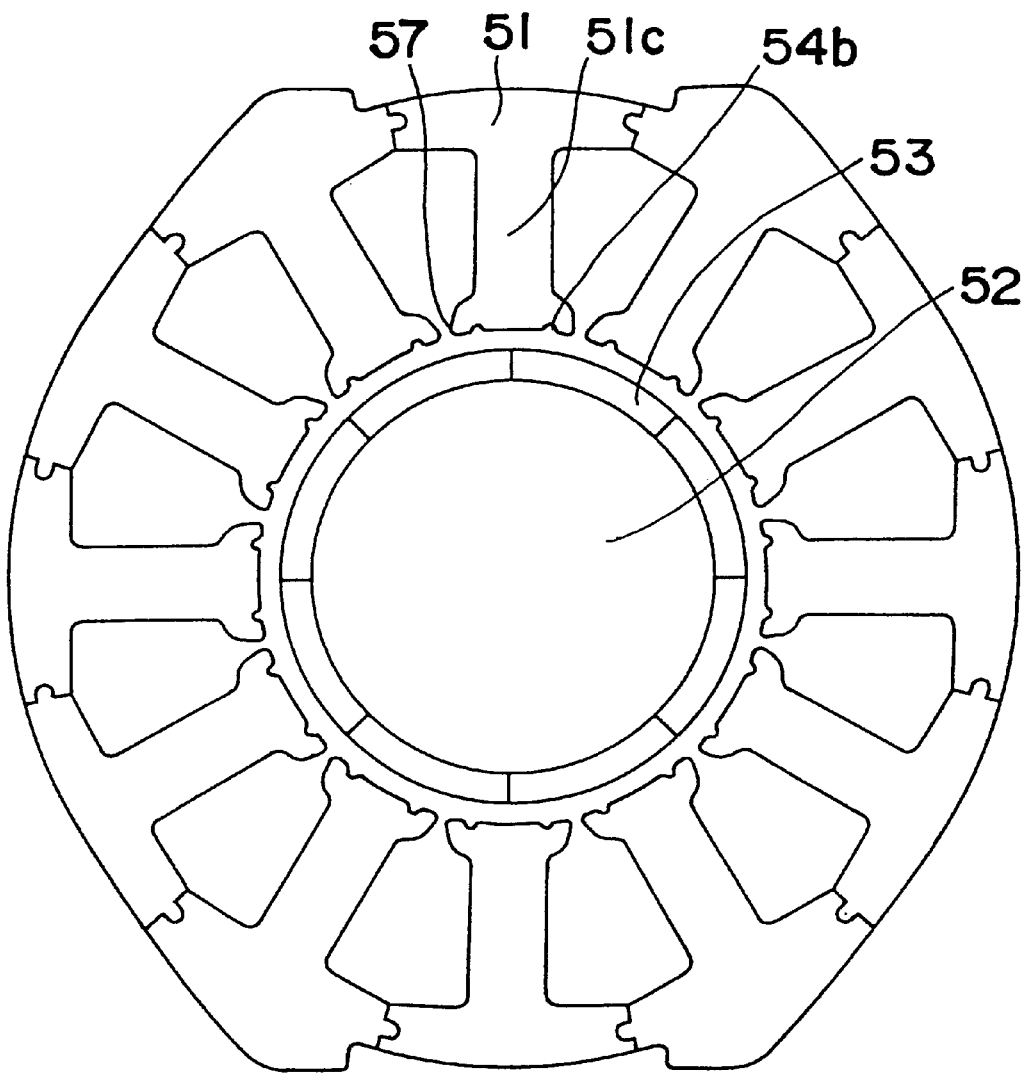
FIG. 20 is a view showing the structure of a permanent magnet motor according to a fifth embodiment of the present invention.
Figure 21:
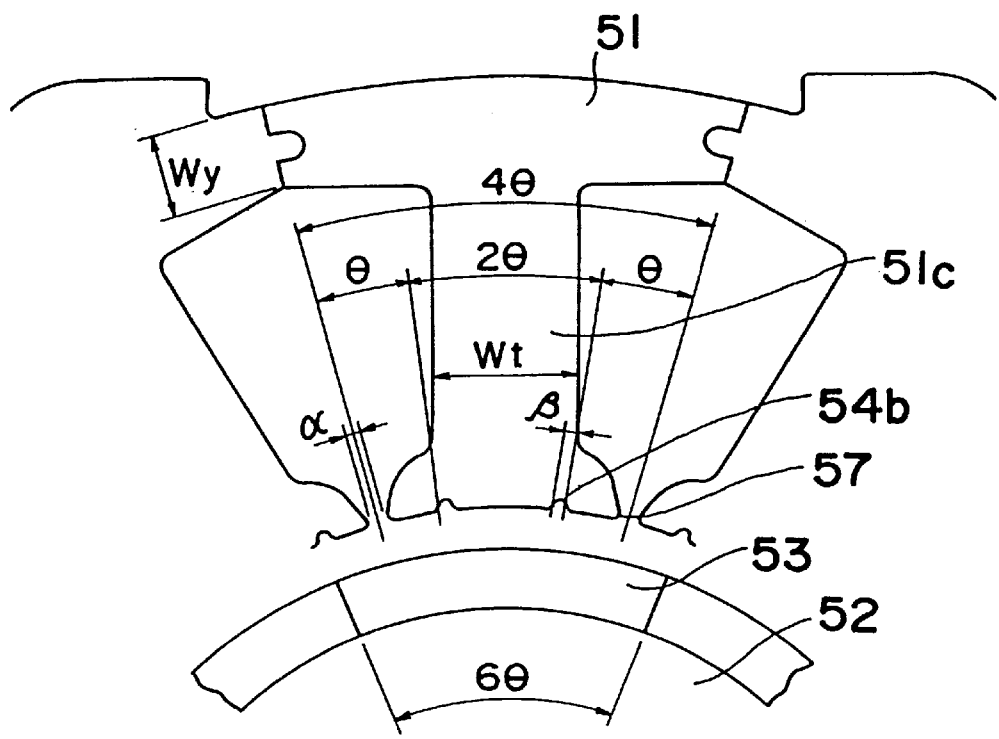
FIG. 21 is an enlarged view of the essential part of the permanent magnet motor shown in FIG. 20.

FIG. 20 is a sectional view of a permanent magnet motor of the 8-pole 12-slot type according to a fifth embodiment of the present invention. FIG. 21 is an enlarged view of the essential part of the motor shown in FIG. 20.

As shown in FIGS. 20 and 21, in this motor, a salient pole section 51c of each stator field core 51 is provided with two supplemental grooves 54b for the purpose of reducing the cogging torque, and these two supplemental grooves 54b are arranged so that the end portion on the winding slot side is positioned at angles of 7.5° and 22.5° with respect to the winding slot center when viewed in the rotor circumference direction.

This motor is provided with a stator in which twelve stator field cores 51 are assembled into a circular arc shape or a semicylindrical shape. Then, each stator field core 51 (stator) is provided with the salient pole section 51c which is formed so as to protrude toward the center side (rotor center side) of the motor. A rotor 52 (permanent magnet rotor) is arranged in a space inside the ring-shaped stator, and eight permanent magnet magnetic poles 53 are fixed in a circular arc shape or a semicylindrical shape on the peripheral portion of this rotor 52. A winding is wound around a winding slot 57 provided between adjacent two stator field cores 51. When a current is made to flow through this winding, the rotor 52 rotates to drive the motor. A tip portion of each salient pole section 51c, i.e., its surface (opposite surface) facing the permanent magnet rotor 52 (permanent magnet magnetic pole 53) is provided with two supplemental grooves 54b.

Then, in this motor, as is apparent from FIG. 21, the slot angle θ of the salient pole section 51c is defined as an angle between a straight line which extends through the center (rotor center) of the permanent magnet rotor 52 and an end portion on the winding slot side of the supplemental grooves 54b and a straight line which extends through the rotor center and the center of the winding slot 57 of the stator field cores 51. Then, in this motor, an angle of the permanent magnet rotor 52 with respect to the length (circumference arc portion) in the rotor circumference direction of each permanent magnet magnetic pole 53 is set to 6θ, an angle of the stator field core 51 with respect to the length in the rotor circumference direction is set to 4θ, and an angle corresponding to an interval (salient pole magnetic pole interval) in the rotor circumference direction between the winding slot side end portions of both the supplemental grooves 54b of the salient pole section 51c is set to 2θ.

Figure 22:
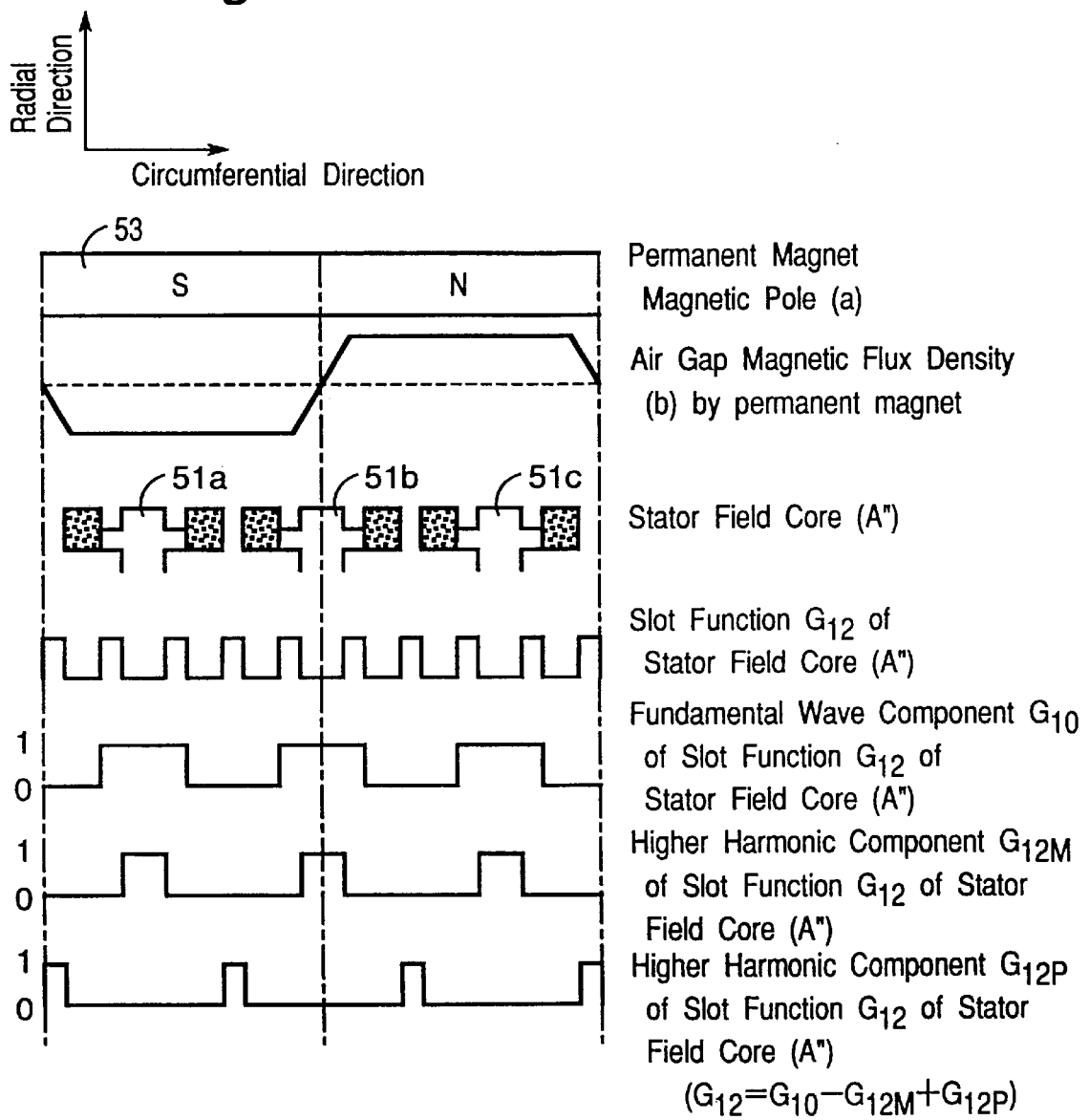
FIG. 22 is a view for explaining the effect of a modification example of the permanent magnet motor shown in FIG. 20.
Figure 23A:
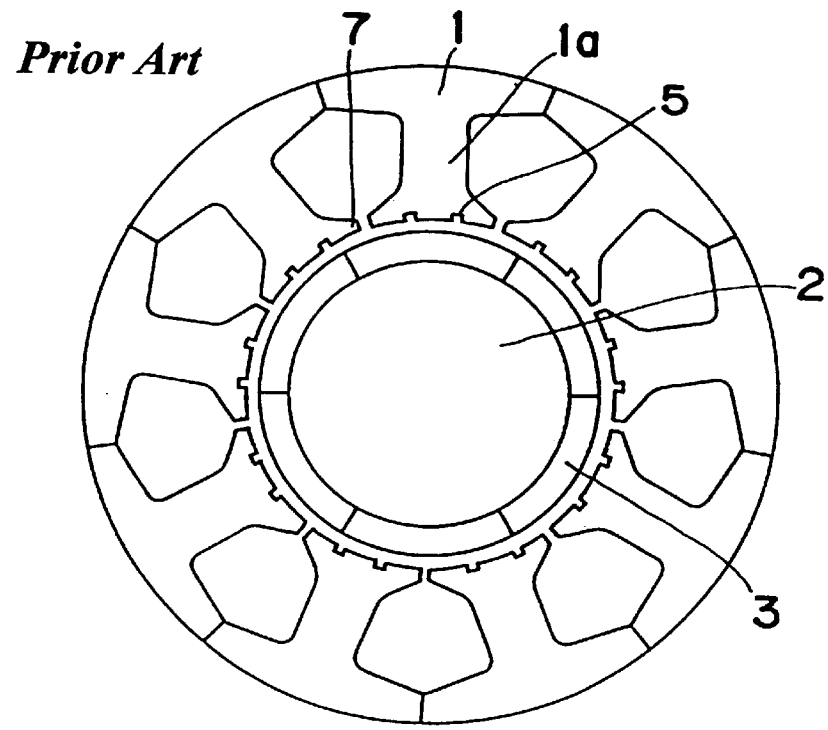
FIG. 23A is a view showing the structure of a prior art permanent magnet motor.
Figure 23B:
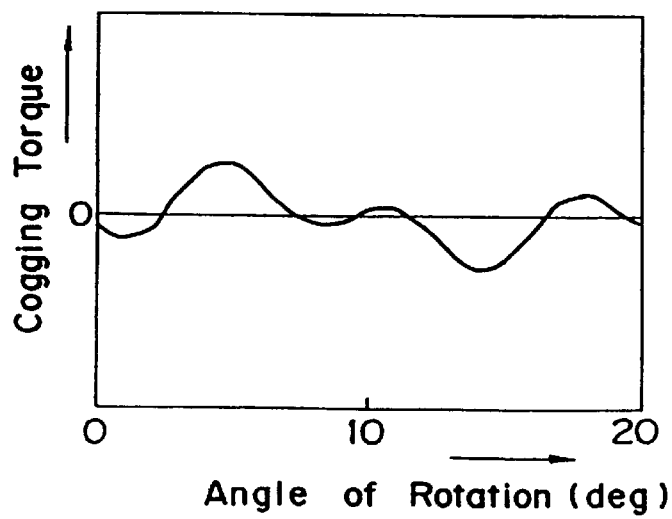
FIG. 23B is a graph showing a relation between an angle of rotation and a cogging torque in the permanent magnet motor shown in FIG. 23A.
Figure 24:
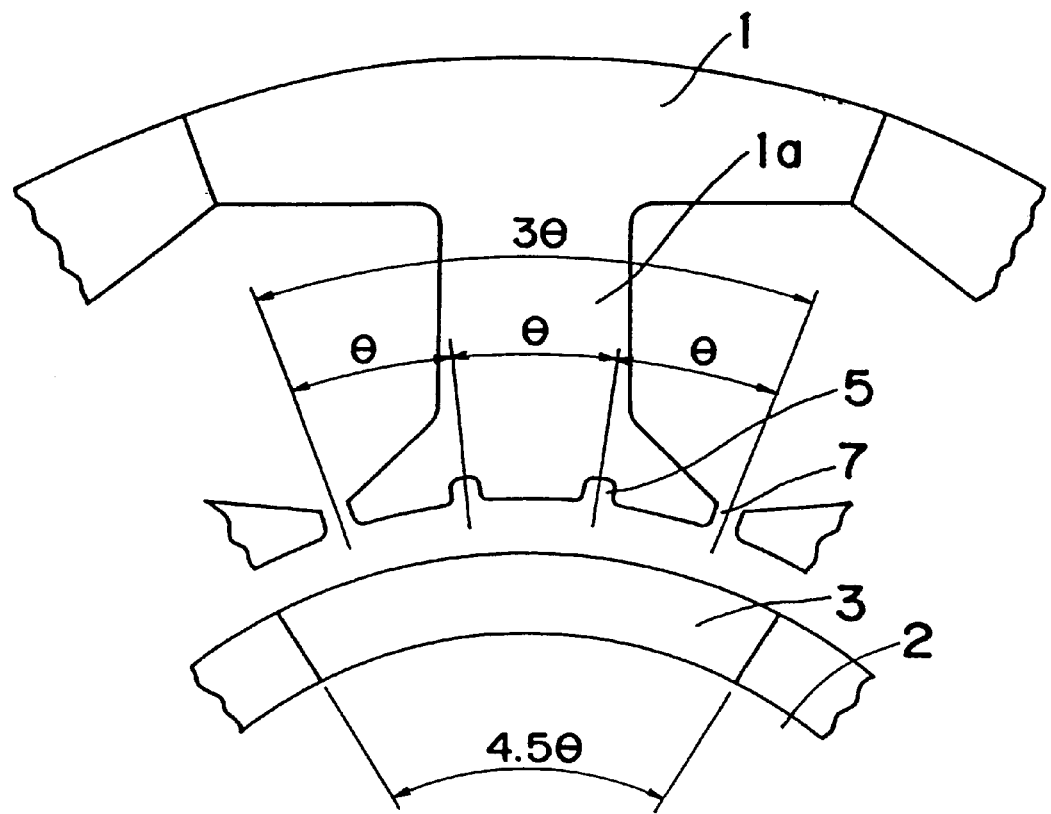
FIG. 24 is an enlarged view of the essential part of the permanent magnet motor shown in FIG. 23A.

FIG. 22 shows a relative positional relation and a relation of force between the permanent magnet magnetic pole 53 and the salient pole section 51c in a motor in which a magnetic field of the permanent magnet magnetic pole 53 is effectively utilized by increasing the area of the salient pole section 51c of the stator field core 51 facing the permanent magnet magnetic pole 53 and a supplemental groove is provided for reducing the cogging torque. In this case, if its slot function $G_{12}$ is drawn, this slot function $G_{12}$ can be separated into a fundamental wave component $G_{10}$ which causes no cogging torque shown in FIG. 18 and higher harmonic components $-G_{12M}$ and $G_{12P}$. Therefore, the greatest fundamental wave component can be removed when the cogging torque components are subjected to a higher harmonic analysis. In this case, the cogging torque which is actually generated is the higher harmonic component of the slot function. That is, the greatest fundamental wave component can be removed when the cogging torque component is subjected to a higher harmonic analysis, and the cogging torque which is actually generated by this becomes the higher harmonic component of the slot function. With this groove arrangement, the cogging torque is reduced.

In the motor of this fifth embodiment, assuming that P is an integer not smaller than one, then the magnetic pole count of the rotor 52 is set to 2P and the salient pole count of the stator field cores 51 is set to 3P. Then, as stated before, the salient pole section 51c of each stator field cores 51 is provided with two supplemental grooves 54b. Assuming that an angle between the salient pole magnetic poles is 4θ, then the two supplemental grooves 54b are arranged so that the end portions on the winding slot side are positioned at angles of θ and 3θ with respect to the center of the winding slot 57 when viewed in the rotor circumference direction.

In the motor of the fifth embodiment, it is preferred that the width β of the supplemental groove 54b in the rotor circumference direction is set within a range of not smaller than 0.5 time to not greater than 1.5 times the width α in the rotor circumference direction of the winding slot 57 of the stator field cores 51 facing the rotor 52. With this arrangement, an effect of cancelling the fundamental wave of the cogging torque by the supplemental grooves 54b is improved, so that the cogging torque is further reduced. In this case, it is specifically preferable to set the width a of the winding slot 57 equal to the width β of the supplemental groove 54b, namely satisfying α=β.

In this motor, assuming that the radius of the surface of the stator field core 51 facing the rotor 52 is r, then it is more preferable to set the width Wt of the salient pole section 51c of the stator field core 51 so that Wt>3·r· cos θ. With this arrangement, the flow of the magnetic flux in the salient pole section 51c becomes smooth, so that the distortion of the magnetic flux is reduced and the cogging torque is further reduced.

In this motor, it is preferable to set the minimum width Wy of a yoke section between salient pole sections of the stator field core 51 and the width Wt of the salient pole section 51c so that 2·Wy≧Wt. With this arrangement, the flow of the magnetic flux in the salient pole section 51c becomes smooth, so that the cogging torque is further reduced.

Further, when driving this permanent magnet motor by a sine wave, the torque pulsation can be further reduced by skewing the permanent magnet magnetic pole 53 by one half of the slot pitch.

When the control system of the permanent magnet motor is sine wave drive, no torque pulsation is generated if the torque pulsation characteristic owned by the permanent magnet motor is a sine wave too. In this case, it is preferable to skew the permanent magnet rotor 52 within a range of not smaller than 0.4 time to not greater than one time the slot pitch of the stator field core 51, and it is specifically preferable to skew it by 0.5 time or 0.47 time.

INDUSTRIAL APPLICABILITY

As described above, the motor of the present invention is useful as a permanent magnet motor and is appropriate for use in machine tools, garment manufacturing machines, robots and the like.

We claim:

1. A motor including a stator field core, wherein the number of magnetic poles of a rotor is set to 2P and the number of salient poles of the stator field core is set to 3P with respect to an integer P of not smaller than one, each of the salient poles of the stator field core being provided with two supplemental grooves;

each of said number of salient poles having first and second ends adjacent other of said number of salient poles such that said first and second ends of said salient pole and a center of said rotor define a salient pole magnetic integer angle 4θ;

said two supplemental grooves being arranged in positions of angles of θ and 3θ with respect to a center of a winding slot in a circumferential direction of the rotor, respectively; and a width of the winding slot of said stator field is equal to a width of each said two supplemental grooves.

2. A motor characterized in that a number of magnetic poles of a rotor is set to 2P and a number of salient poles of a stator field core is set to 3P with respect to an integer P of not smaller than one, each of the salient poles of the stator field core is provided with two supplemental grooves, wherein a salient pole magnetic interpolar angle is 4θ, and said two supplemental grooves have their end portions on the salient pole magnetic pole center side arranged in the positions at angles of θ and 3θ with respect to the center of the winding slot in the circumferential direction of the rotor.

3. A motor characterized in that a number of magnetic poles of a rotor is set to 2P and a number of salient poles of a stator field core is set to 3P with respect to an integer P of not smaller than one, each of the salient poles of the stator field core is provided with two supplemental grooves, wherein a salient pole magnetic interpolar angle is 4θ, and said two supplemental grooves have their end portions on the winding slot side arranged in the positions at angles of θ and 3θ with respect to the center of the winding slot in the circumferential direction of the rotor.

4. A motor as claimed in claim 2, wherein the stator field core is composed of cut type cores.

5. A motor comprising:

a stator field core and a rotor, wherein the number of magnetic poles of the rotor is set to 2P and the number of salient poles of the stator field core is set to 3P with respect to an integer P of not smaller than one;

each of said number salient poles having a salient pole section extending towards said rotor;

a slot angle, defined by a center of the rotor and each inner edge of said salient pole section;

a magnetic pole angle, defined by said center of said rotor and edges of each of said magnetic poles; and a ratio of said magnetic pole angle to said slot angle being N:1, where N is an odd integer number of not smaller than three.

6. A motor as claimed in claim 1, characterized in that said rotor is slot-pitch-skewed within a range of not smaller than 0.4 time to not greater than one time of a salient pole slot of the stator field core.

7. A motor as claimed in claim 1, characterized in that said rotor is slot-pitch-skewed by 5/6 times of a salient pole slot of the stator field core.

8. A motor as claimed in claims 1, characterized in that said rotor is slot-pitch-skewed by 0.5 time of a salient pole slot of the stator field core.

9. A motor as claimed in claim 1, characterized in that said rotor is slot-pitch-skewed by 0.47 time of a salient pole slot of the stator field core.

10. A motor as claimed in claim 1, characterized in that a width α of the winding slot of the stator field core and a width β of said supplemental groove, which are facing said rotor, are set so that 0.5α<β<1.5α.

11. The motor of claim 5, wherein a width of each of said number of salient poles is defined by:

Wt=3r cos θ where Wt is the width of each of said number of salient poles, r is a radius of a stator field core, and θ is said slot angle.

12. The motor of claim 11, wherein a width Wy of a yoke portion of said salient pole section is set such that 2Wy≧Wt.

13. A motor, comprising:

a rotor having a plurality of magnetic poles set to 2P, where P is a positive integer greater than zero, each of said magnetic poles having first and second edges, such that a center of said rotor and said first and second edges define a magnetic pole angle;

a stator field having a plurality of salient poles set to 3P; and each of said number salient poles having a salient pole section extending toward said rotor, such that a center of said rotor and each inward edge of said salient pole section defines a slot angle;

wherein a ratio of said slot angle to said magnetic pole angle is 1:N, where N is an odd integer greater than two.

14. A motor, comprising:

a rotor having a plurality of magnetic poles set to 2P, where P is an integer greater than zero;

a stator field having a plurality of salient poles set to 3P;

each of said salient poles being provided with first and second grooves;

each of said number of salient poles having first and second ends adjacent other of said number of salient poles such that said first and second ends of said salient pole and a center of said rotor define a salient pole magnetic integer angle $4\theta$;

said first and second supplemental grooves being positioned at angles of $\theta$ and $3\theta$ with respect to a center of said rotor, relative to one of said first and second ends of said salient pole; and a width of a winding slot of the stator field being equal to a width of each of said first and second supplemental grooves.

* * * * *

UNITED STATES PATENT AND TRADEMARK OFFICE
CERTIFICATE OF CORRECTION

PATENT NO. : 6,104,117
DATED : August 15, 2000
INVENTOR(S) : T. Nakamura et al.

It is certified that error appears in the above-identified patent and that said Letters Patent is hereby corrected as shown below:

Column 16,
Line 30, of the printed patent, "1" should be -- 5 --.
Line 34, of the printed patent "1" should be -- 5 --.
Line 37, of the printed patent "1" should be -- 5 --.
Line 40, of the printed patent "1" should be -- 5 --.
Line 43, of the printed patent "1" should be -- 5 --.

Signed and Sealed this

Fifteenth Day of January, 2002

Attest:

JAMES E. ROGAN
Director of the United States Patent and Trademark Office

Attesting Officer